United States Patent
Feehrer et al.

(10) Patent No.: US 11,182,309 B2
(45) Date of Patent: Nov. 23, 2021

(54) TECHNIQUES FOR AN EFFICIENT FABRIC ATTACHED MEMORY

(71) Applicant: NVIDIA Corporation, Santa Clara, CA (US)

(72) Inventors: John Feehrer, Westford, MA (US); Denis Foley, Shrewsbury, MA (US); Mark Hummel, Franklin, MA (US); Vyas Venkataraman, Sharon, MA (US); Ram Gummadi, San Jose, CA (US); Samuel H. Duncan, Arlington, MA (US); Glenn Dearth, Groton, MA (US); Brian Kelleher, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/673,537

(22) Filed: Nov. 4, 2019

(65) Prior Publication Data

US 2021/0133123 A1    May 6, 2021

(51) Int. Cl.
| | |
|---|---|
| *G06F 13/16* | (2006.01) |
| *G06F 13/40* | (2006.01) |
| *G06F 9/455* | (2018.01) |
| *G06N 20/00* | (2019.01) |
| *G06F 17/16* | (2006.01) |
| *G06F 12/1027* | (2016.01) |

(52) U.S. Cl.
CPC ...... *G06F 13/1652* (2013.01); *G06F 9/45558* (2013.01); *G06F 12/1027* (2013.01); *G06F 13/1668* (2013.01); *G06F 13/4022* (2013.01); *G06F 17/16* (2013.01); *G06N 20/00* (2019.01); *G06F 2009/45583* (2013.01)

(58) Field of Classification Search
CPC ....... G06F 2009/45583; G06F 13/1652; G06F 13/1668; G06F 13/4022; G06F 9/45558; G06F 12/1027; G06F 17/16
USPC .............................................. 710/316; 711/6
See application file for complete search history.

(56) References Cited

U.S. PATENT DOCUMENTS

| | | | |
|---|---|---|---|
| 7,275,123 B2 | 9/2007 | Duncan et al. | |
| 7,451,259 B2 | 11/2008 | Duncan et al. | |
| 7,627,723 B1 | 12/2009 | Buck et al. | |
| 9,424,201 B2 | 8/2016 | Duluk, Jr. et al. | |
| 9,529,712 B2 * | 12/2016 | Kelleher | G06F 12/0607 |
| 9,639,474 B2 | 5/2017 | Duluk, Jr. et al. | |

(Continued)

OTHER PUBLICATIONS

"DRAM and Storage-Class Memory (SCM) Overview", Gen-Z Confortium, 2016, pp. 1-7, https://genzconsortium.org/wp-content/uploads/2018/05/20170303_Gen-Z-DRAM-and-SCM-Overview.pdf.

(Continued)

*Primary Examiner* — Brian T Misiura
(74) *Attorney, Agent, or Firm* — Nixon & Vanderhye PC

(57) ABSTRACT

Fabric Attached Memory (FAM) provides a pool of memory that can be accessed by one or more processors, such as a graphics processing unit(s) (GPU)(s), over a network fabric. In one instance, a technique is disclosed for using imperfect processors as memory controllers to allow memory, which is local to the imperfect processors, to be accessed by other processors as fabric attached memory. In another instance, memory address compaction is used within the fabric elements to fully utilize the available memory space.

16 Claims, 24 Drawing Sheets

(56) References Cited

U.S. PATENT DOCUMENTS

| | | |
|---|---|---|
| 9,767,036 B2 | 9/2017 | Duluk, Jr. et al. |
| 9,830,210 B2 | 11/2017 | Duluk, Jr. et al. |
| 10,133,677 B2 | 11/2018 | Duluk, Jr. et al. |
| 10,180,916 B2 * | 1/2019 | Rashid .................... G06F 13/12 |
| 10,365,843 B2 * | 7/2019 | Schluessler ............. G06F 3/065 |
| 10,705,951 B2 * | 7/2020 | Patel ....................... G06F 3/064 |
| 10,769,076 B2 | 9/2020 | Duncan et al. |
| 2018/0293011 A1 * | 10/2018 | Schluessler ........... G06F 3/0625 |
| 2019/0286563 A1 * | 9/2019 | Swamy ............... G06F 12/0842 |

OTHER PUBLICATIONS

Achermann et al., "Separating Translation from Protection in Address Spaces with Dynamic Remapping", Proceedings of the 16th Workshop on Hot Topics in Operating Systems, May 7-10, 2017, pp. 118-124, Whistler, BC, Canada (not enclosed).
Chen et al., "Billion node graph inference: iterative processing on the Machine", 2016, pp. 1-11, Hewlett Packard Enterprise Development LP, (12 pages).

* cited by examiner

FIG. 2  High-level software view of architecture

FIG. 4  Stripes of FAM allocated to GPUs

FIG. 5  Sub-dividing stripe into logical stripes

Chassis

FIG. 10 Source GPU spraying with swizzle

Address Translation

Swizzle Effect

| MSI | base address in DIMM | MS offset (32-24) | | MSI | base address in DIMM | MS offset (32-24) |
|---|---|---|---|---|---|---|
| MS0_A1 | 0x0 | 0x0000 | | MS0_X1 | 0x30_0000_0000 (192 GB) | 0x3000 |
| MS0_A2 | 0x4_0000_0000 (16 GB) | 0x0000 | | MS0_X2 | 0x34_0000_0000 (208 GB) | 0x3000 |
| MS0_A3 | 0x8_0000_0000 (32 GB) | 0x0000 | | MS0_X3 | 0x38_0000_0000 (224 GB) | 0x3000 |
| MS0_A4 | 0xC_0000_0000 (48 GB) | 0x0000 | | MS0_X4 | 0xC_0000_0000 (240 GB) | 0x3000 |
| MS0_B1 | 0x10_0000_0000 (64 GB) | 0x0000 | | MS0_Y1 | 0x40_0000_0000 (256 GB) | 0x3000 |
| MS0_B2 | 0x14_0000_0000 (80 GB) | 0x0000 | | MS0_Y2 | 0x44_0000_0000 (272 GB) | 0x3000 |
| MS0_B3 | 0x18_0000_0000 (96 GB) | 0x0000 | | MS0_Y3 | 0x48_0000_0000 (288 GB) | 0x3000 |
| MS0_B4 | 0xC_0000_0000 (112 GB) | 0x0000 | | MS0_Y4 | 0xC_0000_0000 (304 GB) | 0x3000 |
| MS0_C1 | 0x20_0000_0000 (128 GB) | 0x0000 | | MS0_Z1 | 0x4C_0000_0000 (320 GB) | 0x3000 |
| MS0_C2 | 0x24_0000_0000 (144 GB) | 0x0000 | | MS0_Z2 | 0x50_0000_0000 (336 GB) | 0x3000 |
| MS0_C3 | 0x28_0000_0000 (160 GB) | 0x0000 | | MS0_Z3 | 0x54_0000_0000 (352 GB) | 0x3000 |
| MS0_C4 | 0x2C_0000_0000 (176 GB) | 0x0000 | | MS0_Z4 | 0x58_0000_0000 (368 GB) | 0x3000 |

FIG. 14B

No Compaction (Single Address Plane)

Example of Map Slot Programming for Case of 12-Way Spray at Source GPU

TECHNIQUES FOR AN EFFICIENT FABRIC ATTACHED MEMORY

CROSS-REFERENCE TO RELATED APPLICATIONS

None.

STATEMENT REGARDING FEDERALLY SPONSORED RESEARCH OR DEVELOPMENT

None.

FIELD

This technology relates to fabric attached memory ("FAM") and more particularly to fabric attached memory that uses address compaction over high speed data interconnects. Another aspect of this technology relates to use and/or repurposing of reduced-capability graphics processing units (GPUs) as low cost fabric attached memory controllers capable of natively processing atomic functions and/or other memory commands.

BACKGROUND & SUMMARY

There has been an explosion in the amount of data that computers need to maintain and process. Social media, artificial intelligence and the Internet of Things have all created needs to store and quickly process vast amounts of data.

The trend in modern computing has been to deploy high performance, massively parallel processing systems, thus breaking up large computation tasks into many smaller ones that can be performed concurrently. As such parallel processing architectures have become widely adopted, this has in turn created demand for large capacity, high performance, low latency memory that can store large amounts of data and provide parallel processors with quick access.

High bandwidth memory (HBM) connected directly to GPUs or other parallel processors provides high access bandwidth with low latency but its capacity may be relatively limited and thus insufficient for massively parallel workloads having very high memory capacity and/or bandwidth requirements. In the past, when a customer wanted to increase high performance low latency memory capacity, the customer would need to buy more GPUs to integrate the high-performance memory typically bundled with each GPU into the GPU system fabric. But providing more GPUs than are needed for compute functions can be costly and increases power requirements. Some customers may therefore be interested in having a larger memory footprint with fewer GPUs.

One alternative has been to use system memory (SYSMEM)—i.e., memory attached to the system's central processing unit(s) (CPUs). Modern computing architectures also can provide GPUs with access to large quantities of non-volatile system memory via e.g., NVMe (Non-Volatile Memory express) drives and PCIe (Peripheral Component Interconnect express) peer-to-peer access. But a problem with using system memory or non-volatile memory attached as PCIe devices is that access bandwidth is limited in many architectures by such PCIe or other relatively slow data interconnects. Depending on the interconnect between the CPU and GPU, the GPU's memory model semantics might not be mappable over the link with the same performance characteristics. As a result, applications may need to use an alternative programming model as opposed to treating the memory with GPU memory semantics. This type of access may also force a block input/output (I/O) programming model (as opposed to for example word-addressability), with its inherent overheads and latency penalty.

Additionally, even though modern system memory capacity might seem relatively abundant, some massively parallel processing systems are now pushing the envelope in terms of memory capacity. System memory capacity is generally limited based on the maximum address space of whatever CPU(s) is employed. For example, many modern CPUs are unable to access more than approximately three terabytes (TBs). This capacity (three million bytes) may sound like a lot but may not be enough for certain massively parallel GPU operations such as deep learning, data analytics, medical imaging and graphics processing.

From a software perspective, GPUs are becoming faster, enabling systems to perform more compute operations in shorter periods of time. Increased compute capabilities require increased data, which in turn implies it would be useful to provide fast access to more stored data. However, memory bandwidth has not scaled as quickly as GPU compute capabilities. This means it is becoming increasingly more important to keep the GPUs—which are data consumers—fully fed with data to operate on.

To help solve this problem, NVIDIA developed a high-speed datalink interconnect fabric called NVLINK™ which provides increased data transfer speed between GPU compute components. Fabric interconnect arrangements such as NVLINK™ and NVSWITCH™ allow GPUs to communicate with one another as peers over fast, highly scalable multiprocessor interconnects that avoid the bandwidth bottleneck of slower kinds of data links. This allows a GPU to access another GPU's local memory almost as if it were its own, allowing the developer to pool the memory resources of multiple GPUs. See for example U.S. Pat. Nos. 7,275,123, 7,627,723 and 7,451,259. The NVLINK™ construct is slower than local on-chip memory bandwidth but is still much faster than PCIe or other such datalinks that are often used to provide access to main system memory or other memory devices attached to the PCIe fabric.

Fabric Attached Memory ("FAM") has already been defined as a concept to disaggregate memory from compute resources, allowing memory capacity to grow independently of compute capacity. FAM has for example been deployed by datacenter infrastructure providers such as Hewlett Packard Enterprise (HPE) through industry standards such as Gen-Z. For example, HPE recently announced a memory-centric "Machine" using the Gen-Z open standard memory interconnect fabric. See for example https://genzconsortium.org/wp-content/uploads/2018/05/20170303 Gen-Z-DRAM-and-SCM-Overview.pdf; Achermann et al, "Separating Translation from Protection in Address Spaces with Dynamic Remapping", Proceedings of the 16th Workshop on Hot Topics in Operating Systems Pages 118-124(Whistler, BC, Canada, May 7-10, 2017); and Chen, Fei et al, "Billion node graph inference: iterative processing on The Machine" (Hewlett Packard Labs HPE-2016-101, 2016). Despite such prior work, many challenges relating to efficient low-cost high capacity FAM implementations remain.

The technology herein solves the problem of how to increase GPU memory capacity to very high amounts (e.g., 10's to 100's of TB) and bandwidths (e.g., multiple TB/s) for multi-GPU systems without requiring the number of GPUs and/or CPUs to increase. Fabric attached memory is a way to leverage strength and value of a high-bandwidth inter-GPU high speed datalink such as but not limited to the NVIDIA NVLINK™ to allow a user to grow the GPU-accessible memory capacity without having to also grow the GPU compute capacity.

The example non-limiting embodiments allow a user to increase memory capacity and GPU bandwidth without having to increase GPU memory computing resources. The effect of such fabric attached memory is to disaggregate memory in such systems from GPU compute resources, allowing memory capacity to grow independently of GPU compute capacity. Some GPU workloads have very high memory capacity and/or bandwidth requirements. Therefore, some applications may benefit from a larger memory footprint but relatively fewer GPUs. However, as explained below in detail, despite such disaggregation, it is highly desirable in many applications to provide the fabric attached memory with some GPU-like interface capabilities in a cost-effective manner—e.g., so fabric attached memory can implement GPU-based hardware-accelerated memory access functions such as "atomic" memory access requests and so the interconnect fabric can otherwise access the fabric attached memory in the same manner and using the same mechanisms available for accessing GPU direct-attached local memory. As detailed below, the example non-limiting technology herein provides these and other capabilities.

The example non-limiting technologies herein permit the fabric attached memory to be of variable size, and provide address mapping and memory access request distribution techniques for ensuring that the fabric attached memory capacity is fully utilized. For example, an application running on a "source GPU" (i.e., a computing device that wishes to access the fabric attached memory) can generate addresses defining a potentially large address space, e.g., hundreds of terabytes (TBs). In some non-limiting embodiments, this address space can include or be mapped into the source GPU's own locally-attached memory; the locally attached memories of other GPUs; and the fabric attached memory. Meanwhile however, each individual fabric attached memory device (i.e., a controller such as a reduced-compute capacity GPU or custom ASIC and associated bundled semiconductor high-performance volatile or non-volatile memory such as DIMM, which may for example include any memory technologies of interest including for example DDR, GDDR, HBM, NVRAM, NVMe, etc.) will generally provide an address space that is much smaller (e.g., on the order of say 1, 2 or 4 TB as some examples). In general, there can be any number of such individual fabric attached memory devices or modules attached to the interconnect fabric, and the end user can add more fabric attached memory as desired consistent with cost-performance tradeoffs and scalability of the fabric (i.e. number of links and switches).

An advantage of the example non-limiting technology is that end users can conveniently expand fabric attached memory capacity to achieve better performance and reduce thrashing without the need to rewrite or modify software applications. Accordingly, the example non-limiting technology herein provides automatic mechanisms for using entropy to automatically distribute memory access requests across available interconnect links and associated fabric attached memory devices, in order to balance communications and storage/access loading. Furthermore, in example non-limiting embodiments, there is no requirement for each fabric attached memory device to be attached to all available GPU interconnect links—to the contrary, a particular fabric attached memory device can be interconnected to a relatively small subset of interconnect links—although in some applications, sufficient fabric attached memory is preferably provided so the source GPU can access some fabric attached memory over all or many of its links. This structural feature of allowing a fabric attached memory device to connect to the interconnect fabric with a reduced set of interconnects as compared for example to a compute-GPU is useful in providing cost-effective fabric attached memory modules, but also creates some addressing, routing and capacity utilization opportunities that the present example technology exploits.

In particular, the example non-limiting embodiments provide techniques and mechanisms for automatically handling address mapping and request routing between source GPU-generated physical addresses and fabric attached memory address locations so that the capacity of fabric attached memory can be fully utilized even though the source GPU may generate physical addresses that define address spaces much larger than those of any particular fabric attached memory device and even though the source GPU may send such physical addresses over entropy-selected interconnect links, while efficiently and flexibly supporting data striping across an array of such fabric attached memory devices.

By attaching memory directly to a scalable high-speed fabric constructed from high speed inter-process communications links such as NVIDIA's NVLINK™ and NVSWITCH™, the technology herein can provide much higher capacity and bandwidth than CPU memory accessed through PCIe, more flexibility, and a more cost effective platform for running memory-intensive workloads. Memory footprint and performance can thus be "disaggregated" (decoupled) from compute capabilities, and this FAM approach allows GPUs to extend its memory model to cover FAM by issuing load, stores, and atomics with word-level addressability directly to fabric attached memory with appropriate visibility and ordering guarantees. This is especially valuable for GPUs or specialized ASICs for deep learning applications.

The technology herein further provides improvements to FAM that provide cost-effective FAM modules ("FAMMs") based on "floor swept" and/or lower-capability GPUs. As discussed above, it is desirable in many implementations to cost-effectively provide GPU-like peer-to-peer access to fabric attached memory. One non-limiting aspect of certain embodiments of the present technology is deployment of lower-end GPUs that would otherwise be discarded, because of manufacturing yield fallout, as relatively simple and low-power memory controllers that operate as FAMM devices. Some GPU architectures include a sophisticated high-performance memory controller to access its local frame buffer memory, typically using GDDR and/or HBM technology. Instead of having to rely on the mechanical, electrical, and protocol constraints of industry-standard memory form factors (i.e., JEDEC DIMMs) and being tied to 3rd-party product roadmaps, a system designer can leverage "native" GPU parts to more tightly optimize overall system performance, cost, and resiliency.

Straightforward extensions to NVIDIA's CUDA® memory management (or other party's) APIs allow application memory to be pinned to FAM and viewed as peer GPU memory. Alternatively or in addition, the user can opt to rely on Unified Virtual Memory (UVM) and page migration to move transparently between a GPU's local video memory and FAM on an on-demand basis. See for example U.S. Pat. Nos. 9,767,036; 9,830,210; 9,424,201; 9,639,474 & 10,133,677.

The example non-limiting technology herein supports different programming paradigms: a given FAM region can be shared by multiple GPUs cooperating on a large high performance computing (HPC) problem for example or dedicated to a single GPU in a Cloud Service Provider (CSP) environment where each GPU runs a different customer's virtual machine (VM). If performance or fault isolation among the different GPUs accessing different FAM regions is desired, this can be achieved through fabric topology construction or programming congestion control features in the interconnect fabric switches. Additionally, a subset of FAM donors can be assigned to specific GPUs, users and/or VMs to allow for policy defined Quality-of-Service guarantees between GPUs or tenants.

An example non-limiting system thus connects one or a set of "source GPUs" to one or a set of fabric attached memory modules (FAMMs) through an NVLINK™ interconnect fabric built with NVLINK™ switches. The source GPUs interleave ("spray") memory requests over a programmable set of NVLINK™s and those requests are routed by the fabric to the set of FAMM devices. In some non-limiting implementations, a "donor" GPU (which may have reduced capability as described herein) and discrete DRAM chips it connects to over its frame buffer (FB) interface are placed together on a printed circuit board referred to as a FAM baseboard. An overall system can have any number of these FAM baseboards—none, one, two, three or n where n is any integer.

In one non-limiting embodiment, each FAMM connects to the fabric via a small number of NVLINK™ links (e.g., 2 or 4), as compared to a larger number of links available to the source GPU. In some non-limiting embodiments, the donor GPU within a FAMM is structured so it cannot be used as a full-fledged GPU because some portion of its engines and/or cache have faults, are permanently disabled, or don't exist; but at least some of its NVLINK™ interconnects and its memory interface portions are fully functional. The FAMM's donor GPU needs only a minimal number of engines functional to perform memory initialization and diagnostics operations run at power-on or when the Cloud Service Provider (CSP) changes the guest VM assigned to the FAMM. In example non-limiting embodiments, a stripped-down version of the GPU driver or other software can handle these functions as well as interrupt handling for memory and GPU-internal errors.

Additional Non-Limiting Features and Advantages Include:

- In some non-limiting embodiments, use of floor swept GPUs as FAM memory controllers ("FAM donors") rather than industry-standard DIMMs with 3rd-party memory controllers. This provides higher compatibility, reduces dependency on 3rd-party form factors and standards, lowers overall system cost, capitalizes on the sophistication and known features of the in-house GPU memory controller (for both performance and resiliency), and allows tighter integration of compute and memory system elements.
- Because the source GPUs and the FAM donor GPUs in some embodiments use the same protocol, the source GPU can issue the full set of transactions supported by the fabric protocol, including "atomic" operations as well as the set of memory read and write transactions. Such atomic operations can include for example arithmetic functions such as atomicAdd( ), atomicSub( ), atomicExch( ), atomicMin( ), atomicMax( ), atomicInc( ), atomicDec( ), atomicCAS( ); bitwise functions such as atomicAnd( ), atomicOr( ), atomicXor( ); and other functions. The ability of some non-limiting embodiments to perform native "atomics" is especially valuable, as many workloads use atomics for synchronization operations. An alternative to native atomics is mimicking atomics using read-modify-write (RMW) operations, incurring higher latency and potential burdens on the fabric switches to do the necessary conversion between RMWs and atomics.
- Ability to interleave physical pages mapped to FAM across multiple FAM donors such that the source GPU's bandwidth to FAM can scale up to the aggregate bandwidth for all the donors in the "stripe" collectively making up a given memory page. By "stripe" we mean one of the logical sets of FAM devices organized to attach to the fabric in such a way so as to increase memory performance, reliability or both.
- Tasks of memory initialization and diagnostics are performed locally, in the donor GPUs and their stripped-down drivers, rather than being controlled by a host CPU or by hardware engines in the fabric. When there is a change in ownership of a FAM region, its contents can be wiped for security reasons and in some cases simple diagnostics are run at this time. Offloading these tasks from a central resource means that local components can more rapidly transition a region of FAM from one virtual machine (VM) to another as guest workloads migrate within the cloud; there is less down time for new VMs and no impact on running VMs whose resources are not shifting.
- Provides a scalable hardware/software platform to customers doing a variety of workloads requiring the compute capacity of multiple high-end GPUs—e.g., Deep Learning, graph analytics, recommender engines, HPC, medical imaging, image rendering, database and transaction processing, etc. For many of these applications, the memory bandwidth and/or capacity requirements are growing at a faster rate than the GPU or CPU compute requirements. The technology herein expands the portfolio of datacenter and other infrastructure by enabling more flexibility in the mix of compute and memory resources.
  - In some embodiments, software can virtually disable links and/or FAM donors to allow for continued operation of the system with degraded capacity or bandwidth in an administrator-controlled manner. Applications that use FAM would need no further modification to handle the reduced capacity or bandwidth.
- In some embodiments, individual defective pages on a given FAM donor can be remapped and controlled in software such that a subsequent job is able to avoid ECC double bit errors or getting stuck at faults in memory, without needing an entire FAM chassis to be rebooted.
- The technology herein leverages the performance and scalability characteristics of high-speed interconnect fabrics such as NVLINK™ and NVSWITCH™.
- The ability to redeem silicon that would otherwise have to be scrapped because of faults in the units required for normal applications.
- The architectural concepts are general enough that they can be applied to any multi-GPU systems and to future larger platforms that span multiple chassis' in a rack.
- Combined with software extensions to allocate/manage FAM as peer memory and extensions to enable migration between video memory and FAM, this hardware concept builds on existing multi-GPU systems and makes possible a roadmap that extends into the future.

BRIEF DESCRIPTION OF THE DRAWINGS

The following detailed description of exemplary non-limiting illustrative embodiments is to be read in conjunction with the drawings of which:

FIGS. 13, 14A and 14B show example map slot programming;

DETAILED DESCRIPTION OF PREFERRED EMBODIMENTS

Example Non-Limiting System 100

Figure 1:
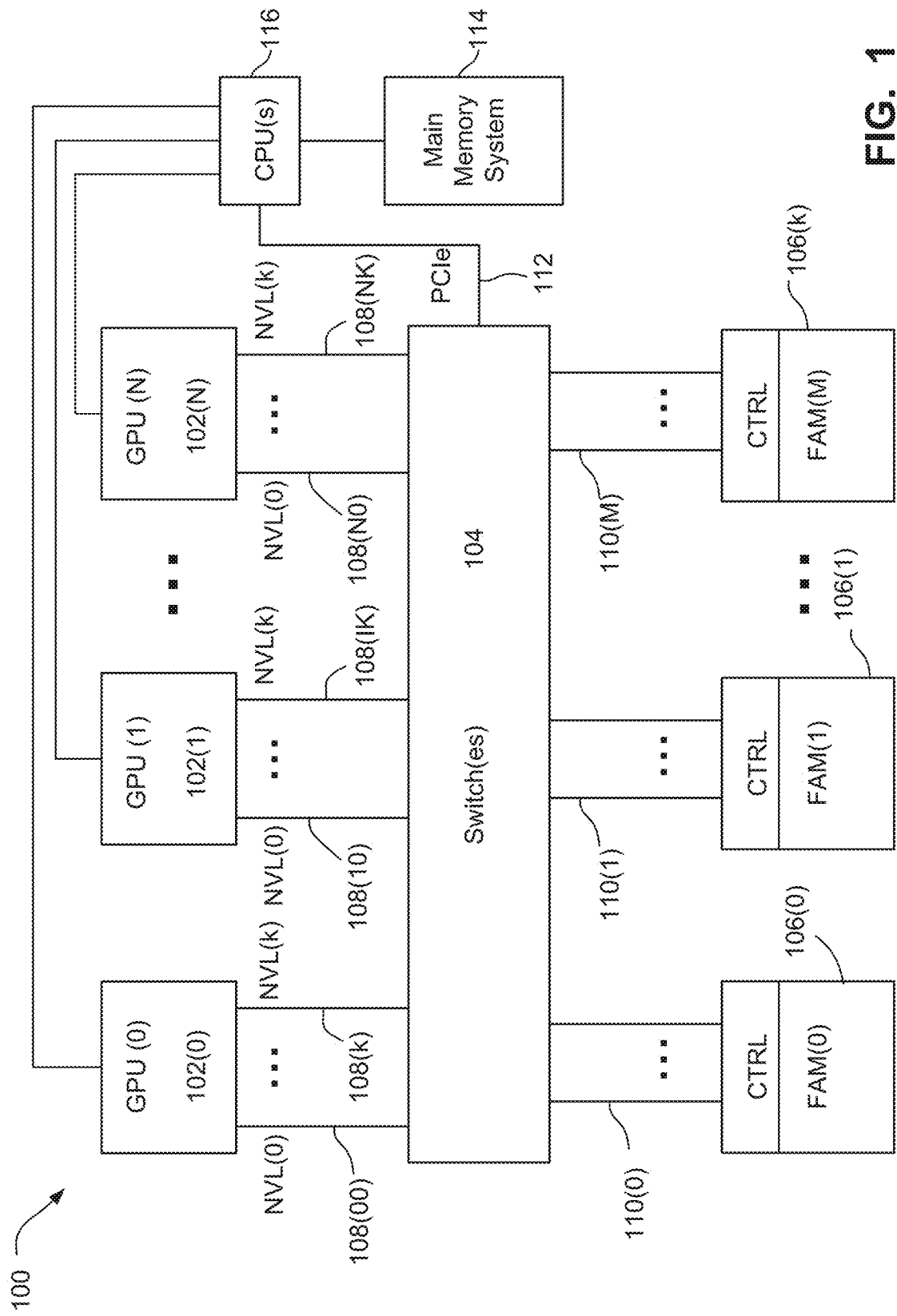
FIG. 1 shows a non-limiting example fabric attached memory system.

FIG. 1 is a block diagram of an example non-limiting system 100 supporting fabric attached memory (FAM). In the FIG. 1 system 100 shown, a plurality (N) of GPUs 102(0), 102(1), . . . 102(N) communicate with one another via a high-performance high-bandwidth interconnect fabric such as NVIDIA's NVLINK™ as one example. Other systems may provide a single GPU 102(0) that is connected to NVLINK™.

The NVLINK™ interconnect fabric (which includes links 108, 110 and switch(es) 104) provides multiple high-speed links NVL(0)-NVL(k) connecting GPUs 102. In the example shown, each GPU 102 connects with the switch 104 via k high-speed links 108(0)-108(k). Thus, GPU 102(0) connects to switch 104 via links 108(00)-108(0 k), GPU 102(1) connects to the switch via links 108(10)-108(1k), and so on. In some example embodiments, k=12. But in other embodiments, the different GPUs 102 can connect with switch 104 via different numbers of links 108, or some GPUs can connect directly with other GPUs without interconnecting through switch 104 (see e.g., FIG. 23).

In the example embodiment shown, each GPU 102 can use high-speed links 108 and switch 104 to communicate with the memory provided by any or all of the other GPUs 102. For example, there may be instances and applications in which each GPU 102 requires more memory than is provided by its own locally attached memory. As some non-limiting use cases, when system 100 is performing deep learning training of large models using network activation offload, analyzing "big data" (e.g., RAPIDS analytics (ETL), in-memory database analytics, graph analytics, etc.), computational pathology using deep learning, medical imaging, graphics rendering or the like, it may require more memory than is available as part of each GPU 102.

As one possible solution, each GPU 102 of FIG. 1 can use links 108 and switch 104 to access memory local to any other GPU as if it were the GPU's own local memory. Thus, each GPU 102 may be provided with its own locally attached memory that it can access without initiating transactions over the interconnect fabric but may also use the interconnect fabric to address/access individual words of the local memory of other GPUs interconnected to the fabric. In some non-limiting embodiments, each GPU 102 is able to access such local memory of other GPUs using MMU hardware-accelerated atomic functions that read a memory location, modify the read value and write the results back to the memory location without requiring load-to-register and store-from-register commands (see above).

Such access by one GPU of the local memory of another GPU may be "the same" (although not quite as fast), from the perspective of an application executing on the GPU originating the access, as if the GPU were accessing its own locally attached memory. Hardware within each GPU 102 and hardware within switch 104 provides necessary address translations to map virtual addresses used by the executing application into physical memory addresses of the GPU's own local memory and the local memory of one or more other GPUs. As explained herein, such peer-to-peer access is extended to fabric attached memory without the concomitant expense of adding further compute-capable GPUs.

FIG. 1 (and see also FIG. 26 for another view) also shows that each GPU 102 can access a main memory system 114 within the address space(s) of one or more CPUs 116/150. However, because the interconnect between switch 104 and main memory system 114 is via a relatively slow PCIe bus(es) 112, access by GPUs 102 to main memory system 114 may involve relatively high latency and thus slow performance.

To provide GPUs 102 with access to additional high-performance low latency storage, the FIG. 1 system provides a new kind of GPU peer—fabric attached memory modules (FAMMs) 106 each comprising a specialized memory controller and associated high performance memory. The GPUs 102 communicate with the FAMMs 106 via the same high-speed interconnect 108, 110, 104 the GPUs use to communicate with one another. Thus, each of FAMMs 106 connect with switch 104 via one or more high-speed links 110 that, in one example non-limiting embodiment, may have the same bandwidth as the links 108 the GPUs 102 use to communicate with the switch 104. Each of FAMMs 106 may communicate with switch 104 over any number of links 110 although in some non-limiting cases the number of links 110 each FAMM 106 uses to communicate with the switch is less than number (k) of links each GPU 102 uses to communicate with the switch.

Until now, what has been on the other side of NVLINK™ interconnect fabric 108, 110, 104 from the perspective of a GPU 102 or a CPU is other (e.g., peer) compute GPUs. The present non-limiting technology provides GPUs 102 with peer-to-peer access to another kind of device—additional FAM memory 106 that is much faster than system memory 114 and which (collectively) offers capacities that are much larger (potentially) than the GPUs' own locally connected memory and the pool of local memory connected to all compute GPUs in the system. Thus, using the example non-limiting technology herein, this additional FAM memory 106 looks like locally-connected or peer memory in the sense that existing applications can access the FAM memory in the same way they access peer GPU memory (i.e., additional memory local to other GPUs 102). A GPU application can easily make use of additional fabric attached memory 106 accessible via NVLINK™ 108, 110, 104 with no or few modifications and get capability to store its work execution into additional, high performance memory. The example non-limiting technology thus enables a GPU 102 to get much higher memory access bandwidth than it could using access to main system memory 114 with capacities that are at least as large as (and in some embodiments, much larger than) memory capacities of the memory 114 available to the CPU 116.

Furthermore, in one non-limiting embodiment, the example non-limiting technology supports the entire GPU memory model—meaning that all of the operations that are incorporated into the application are all run natively and do not require any emulation or other slower path accommodations such as for GPU atomic operations (which may be different from a or the set of atomics that are present on the CPU 116). Such interfaces between GPU atomics and CPU atomics might require slower, software-intermediated operations or in some cases a hardware translator or other intermediator—which is still slower than being able to run GPU atomics natively.

Example FAM Implementation

Figure 2:
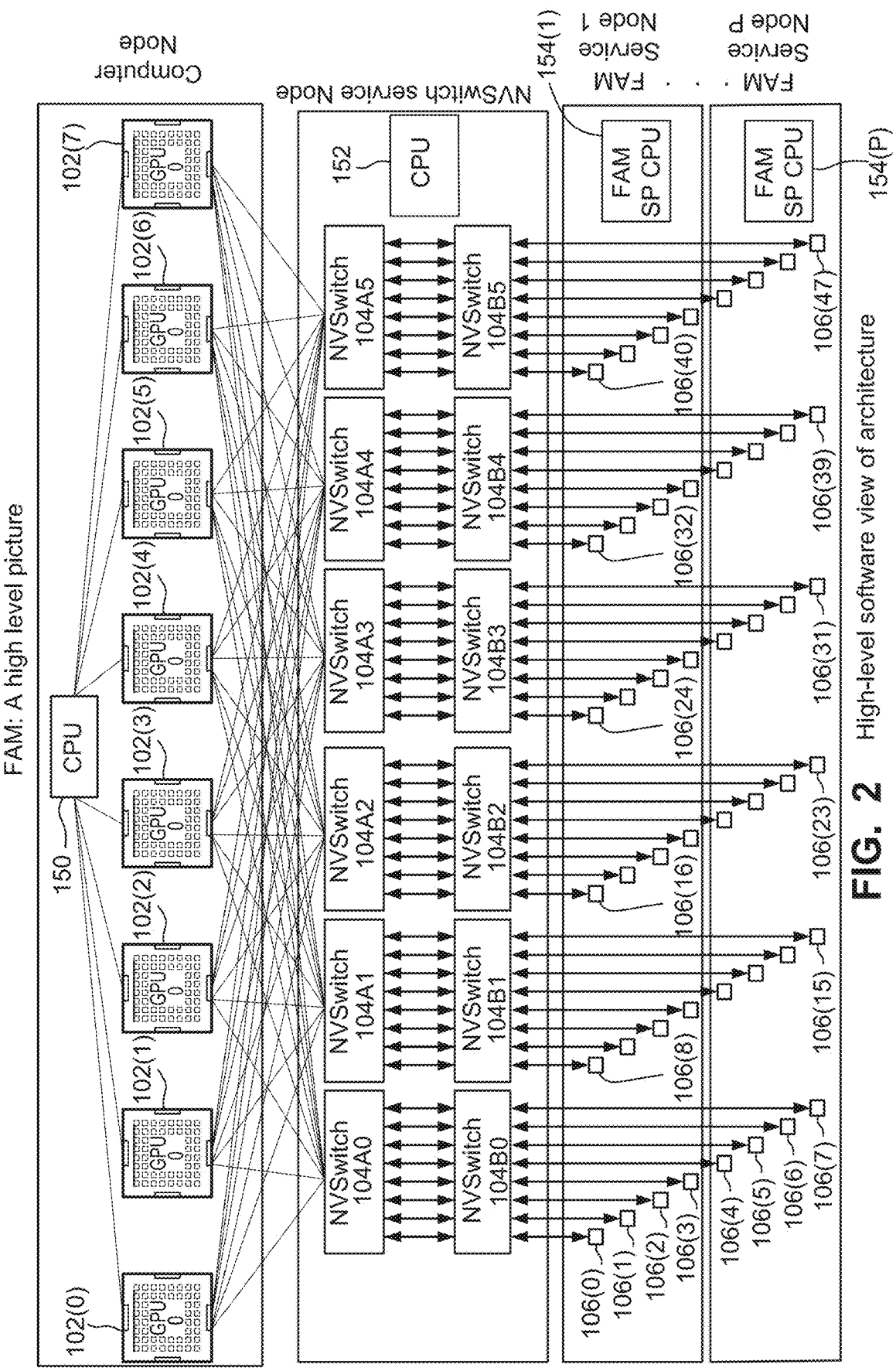
FIG. 2 shows a high-level software view of the FIG. 1 fabric attached memory architecture.

FIG. 2 shows an example implementation of the FIG. 1 system including 8 GPUs 102(0)-107(7). NVLINK™ switches 104 may be disposed on a GPU Baseboard and mid-plane in a multi-GPU system. FIG. 2 shows that switch(es) 104 may be distributed across several functional switch modules 104A0-104A5, 104B0-104B5 as supervised by a service processor 152. FIG. 2 further shows plural FAM boards or backplanes (the horizontal blocks in the lower part of the drawing) each implementing a plurality of FAMMs 106 and each supervised by a FAM service processor(s) (SP) CPU 154. There may be any number of FAM boards or backplanes. A FAM Service Processor CPU 154 in one example embodiment is located on or near each FAM Baseboard and is used to manage the devices (FAMMs and switches, if present) on the baseboard. The FAM SP CPU 154 may in one implementation run a different operating system than host CPUs 150 and a different operating system from the service processor 152 that manages source GPUs 102 and switches 104 on a GPU Baseboard and midplane (if present). The FAM SP CPU 154 may for example manage all of the FAMMs 106 on the baseboard through a link(s) such as PCIe. The FAM SP CPU 154 in one embodiment executes instructions stored in an additional non-transitory memory connected to it to perform some or all of the following management functions:

Initialization of donors
    Configuration of memory controller registers
    Zeroing the contents of DRAM
Error monitoring and handling
    DRAM SBEs and DBEs
    memory controller internal errors
Performance monitoring
    Configuration and polling of performance monitors
    Processing of values read from monitors to compute statistics on throughput, etc.
Row remapper functions
    Responding to interrupts indicating SBE and DBE events
    Management of per-FBPA (frame buffer partition address) table that performs address remapping
    Environmental (power, thermal) monitoring (or this can be handled by a Baseboard Management Controller (BMC) not shown; or rather than having a separate BMC on the FAM Baseboard, the existing chassis BMC that monitors source GPUs 102 will extend its scope of responsibilities to include monitoring of the FAMMs 106.)

"Floor Swept" GPUs as Disaggregated Fabric Attached Memory Controllers

Example non-limiting embodiments provide disaggregation between GPUs 102 and memory by implementing FAMM 106 using low end, relatively inexpensive memory controller hardware that in some cases is much less costly and less power intensive as compared to a full-fledged GPU but which can still offer fully-capable peer-to-peer access. Such memory controller hardware is used primarily or exclusively for communicating with DRAM or other semiconductor memory and does not need to perform tasks that are not needed for memory access and control, such as compute or copy functions.

One non-limiting opportunity is to implement FAMMs 106 using so-called "floor swept" GPUs that otherwise would or could not be sold in products because of manufacturing defects that prevent them from functioning properly for compute applications. If the defects of such floor swept GPU components do not affect the ability of the component to communicate with other GPUs, participate in the interconnect fabric and access bundled memory, the component can be used as a fabric attached memory controller and other functions can be permanently disabled or deactivated to conserve power.

In some non-limiting embodiments, the donor GPU within FAMM 106 operates as a slave-only device, in that it responds only to requests received from link 108; it does not initiate requests on the fabric (but other types of FAM donor GPUs could initiate such requests). The donor GPU thus configured is referred to as a "floor swept" part, with the non-functional units fused off or otherwise intentionally disabled so that they consume reduced (e.g., in some cases, only leakage) power. See e.g., FIG. 3. In example embodiments, a mechanism is provided so that software executing on the system is able to identify such a FAM donor GPU and distinguish it from a compute GPU.

An advantage of using a subset of a "normal" GPU functionally as a FAM memory controller is that a memory controller with such a subset capability is able to communicate with other GPUs 102 using a full set of functionalities including for example reads, writes and "atomic" memory access functions. Generally, as discussed above, an atomic function performs a read-modify-write atomic operation on one (e.g., 32-bit or 64-bit) word residing in global or shared memory using hardware acceleration. For example, atomicAdd( ) reads a word at some address in global or shared memory, adds a number to it, and writes the result back to the same address. The operation is "atomic" in the sense that it is guaranteed to be performed without interference from other threads. In other words, memory controller hardware typically performs the atomic operation, and no other thread can access this address until the operation is complete.

Because inter-GPU atomic commands are available in the fabric attached memories 106 provided by some non-limiting embodiments herein, a "source" GPU 102 attempting to access memory through a "donor" GPU-based memory controller 106 can use a full set of inter-GPU communication protocol transactions including such atomic functions, allowing the application to get better performance. Performance is increased because the atomics can be run natively in hardware, providing speed performance benefits. Furthermore, compatibility is maintained so the same threads that are designed to communicate with other GPUs 102 can also access fabric attached memory 106 even though such FAM is not necessarily accessed through a full-capability GPU. While atomic functions can be emulated using more basic read-modify-write commands and other techniques, it is highly efficient to provide donor GPUs with natively implemented atomic function capabilities in some non-limiting examples.

Some example non-limiting implementations might not support atomics natively. The inability to natively support atomics may support applications on the source GPU that are rewritten or initially designed to replace the native atomics operations with read/modify/write instructions or require the donor GPU's to emulate atomics. This would decrease performance but could nevertheless function well in certain applications.

In one example non-limiting embodiment, it may be possible to design or construct a specialized piece of hardware such as a specialized memory controller that is not a GPU but nevertheless provides sufficient functionality to participate in the fabric attached memory architecture described herein. One such implementation could be a very simple GPU-like device that has a memory controller on it. Such a device could have minimal functionality necessary to process NVLINK™ commands including atomics as well as some primitive engines that can do initialization and clearing of memory. One example minimum GPU configuration needed to implement FAMM 106 might include a logical-to-physical link mapping function, two NVLINK™ ports (which two could vary from one donor to another), and certain other functionality e.g., for processing atomics, inbound address translation, and other functionality). As the block diagram of FIG. 3 indicates, such minimum capabilities might include for example the following:

Capacity. Nominal capacity assumes 3DS (3D stacking) and 4H (4-high) 16 GB×8 semiconductor memory parts in some example embodiments.

Bandwidth. The DRAM interface in some embodiments is matched to the bidirectional NVLINK™ bandwidth for the two highspeed links attached to the FAM DIMM (dual inline memory module(s)). There are two scenarios where the achievable DRAM bandwidth is less than this: (1) Stream of small writes, e.g., less than 32B. Writes of this size require the GPU memory controller to perform a read-modify-write. The same applies to NVLINK™ atomic operations. Most FAM workloads of interest do not include long sequences of small writes or atomics, i.e. they are more sporadic. (2) Random sequence of addresses across the DIMM or other high speed memory address space. Random accesses will cause a higher frequency of L2 cache misses and will create poor DRAM efficiency in general because more accesses will be to closed banks. A closed bank can be opened (activated) prior to the DRAM read cycle and the resulting overhead steals from bandwidth available. This sort of pattern is not expected for many FAM workloads but is possible. These specific constraints are examples only and are non-limiting although many memory controllers will have some access size at which write performance drops because they need to do read-modify-write, and will also have the open vs. closed bank behavior.

Row Remapper. Additional Reliability/Accessibility/Serviceability (RAS) features in the donor GPU, along with software to manage them, can be readily employed for FAM. These features become more important with the capacity levels of FAM reaching into the 10's or potentially the 100's of TB. An example is the GPU row remapper function, which reserves a set of spare DRAM locations per bank. Row remapping feature(s) is/are helpful as a resiliency feature in FAM. When an uncorrectable (e.g., double bit error (DBE)) is detected, the system may be brought down so that system software can remap the DRAM page that suffered the DBE to a spare page. Software managing the donor GPU can configure the row remapper table remap accesses to the row suffering the error to one of the reserved rows. The remapping in some embodiments is not done on-the-fly due to security concerns.

Link L1 Cache Translation Lookaside Buffer (TLB) coverage of the entire DRAM capacity. Software may use the Fabric Linear Address (FLA) capability (see below) to remap a page that suffered a DBE between the time the DBE is detected, and the system is brought down to do the remapping operation.

Support for inbound NVLINK™ read-modify-write. This is used to inter-operate if new NVLINK™ atomic operations that aren't supported natively by the GPU are added.

Ability to do self-test and initialization of DRAM. In order to perform these functions, a minimal set of engines may be available and powered on.

The donor GPU, depending on its floor swept capabilities, can be enabled to offload certain housekeeping and management tasks from the centralized system management processor or host CPU, performing operations such as memory diagnostics at system initialization time or security measures (e.g. clearing the donor's memory contents when its ownership shifts from one VM to another).

Thus in one embodiment, the FAMM 106 memory controller has no GPU compute capability but comprises:
a boot ROM;
a DDR memory controller capable of hardware-accelerating said atomics without emulation;
a DRAM row remapper;
a data cache;
a crossbar interconnection;
a fabric interconnect interface capable of peer-to-peer communication over the interconnect fabric with GPUs; and
DRAM interface circuitry.

Herein, "GPU compute capability" means multi-core, multi-threaded parallel execution compute capabilities, which include hardware-accelerated graphics pipeline-based shading, real time ray tracing, deep learning acceleration and/or real time computer vision implemented by streaming multiprocessor cores, ray tracing cores, tensor cores and texture units, as for example exemplified by NVIDIA's VOLTA, TURING, and/or AMPERE GPU architectures.

Figure 3:
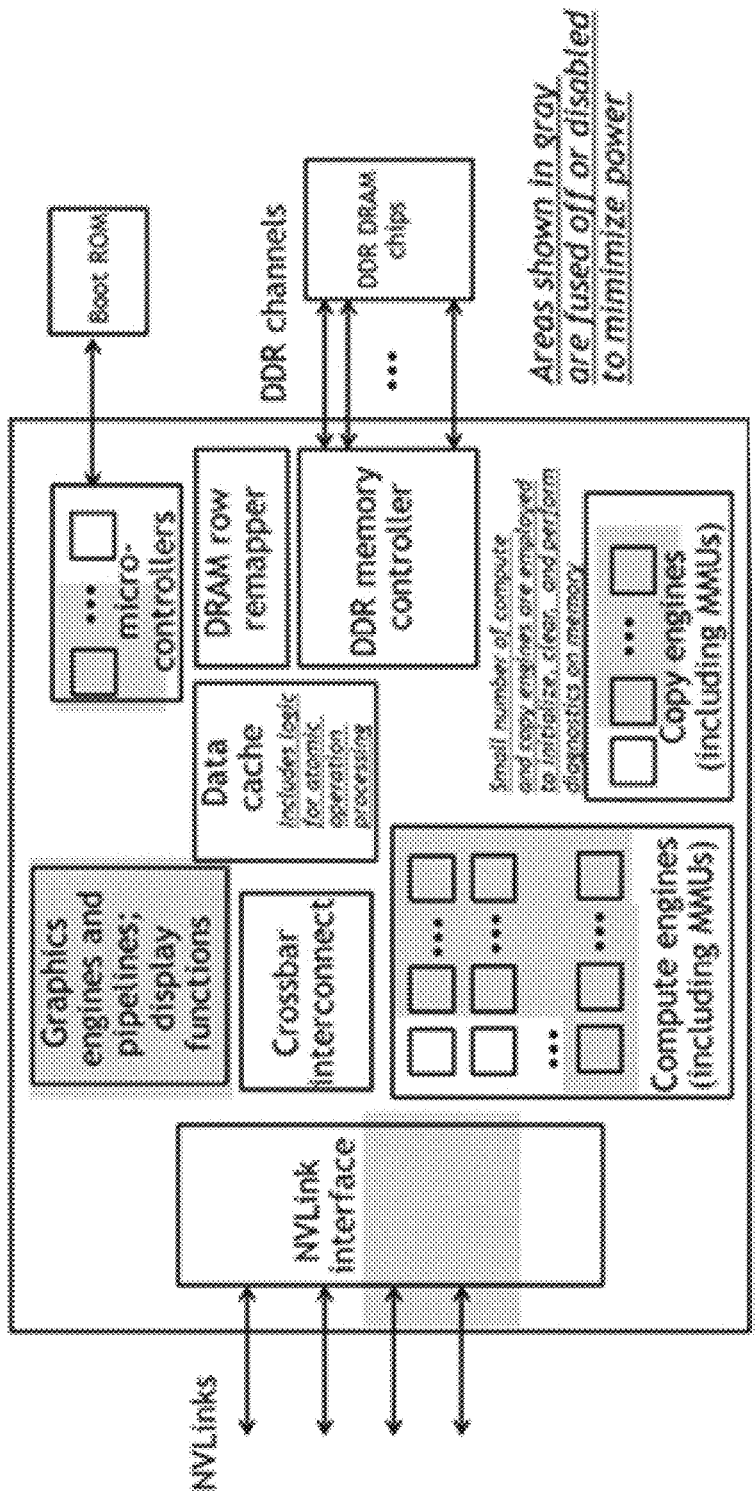
FIG. 3 illustrates an example reduced-capability GPU for use in a fabric attached memory.

Yet another option would be (as is shown in FIG. 3) to take fully capable GPUs and fuse off most of the compute and copy engine capabilities as described above of such GPUs to make them suitable for use (only) as FAM donor GPUs. In one non-limiting example, the following units can be fused off for FAM in order to save power: NVENC, NVDEC, Display, 2 NVL3 ports, and all Syspipes other than Syspipe0. Thus for example, all graphics engines and pipelines and all display functions; all microcontrollers; all compute engines; and all copy engines can be non-reversibly fused off or disabled (or otherwise not present) in the GPUs used as FAM memory controllers. Such intentional degradation (which could be accomplished also by redesign) could for example disable certain compute capability functions that would typically be present in any, most or all of the fully functional GPUs in the system, such as any or all of the following: (a) atomic addition operating on 32-bit floating point values in global and shared memory (atomicAdd( )); (b) atomic addition operating on 64-bit floating point values in global memory and shared memory (atomicAdd( )); (c) warp vote and ballot functions; (d) Memory Fence Functions; (e) Synchronization Functions; (Surface functions; (g) 3D grid of thread blocks; (h) Unified Memory Programming except as otherwise explained herein; (i) funnel shift; (j) dynamic parallelism; (k) half-precision floating-point operations: (1) addition, subtraction, multiplication, comparison, warp shuffle functions, conversion; and (m) tensor core. Such intentionally degraded (and/or redesigned) devices would thus not be useful for compute functionality (nor could they be easily modified by end users to restore lost compute functionality) but would still provide sufficient GPU-like functionality to support the fabric attached memory architectures described herein. Such fusing or other modifications would have the additional benefit of reducing power consumption, which could become an advantage in applications where there are many donor GPUs and/or where the power requirements are especially important (e.g., in autonomous vehicles, portable computing, spacecraft, submersibles, or any other usage where power consumption and/or heat generation should be minimized).

Example Non-Limiting Data Stripes

Data striping is a technique that allows a processor such as a GPU to spread its memory storage over a number of different FAMM memory devices. Using data striping, a source GPU 102 can write data to N different memory devices such as FAMMs 106 in parallel. The N memory devices can perform the accesses in parallel in 1/Nth the time it would have required one memory device to sequentially perform the same accesses.

Figure 4:
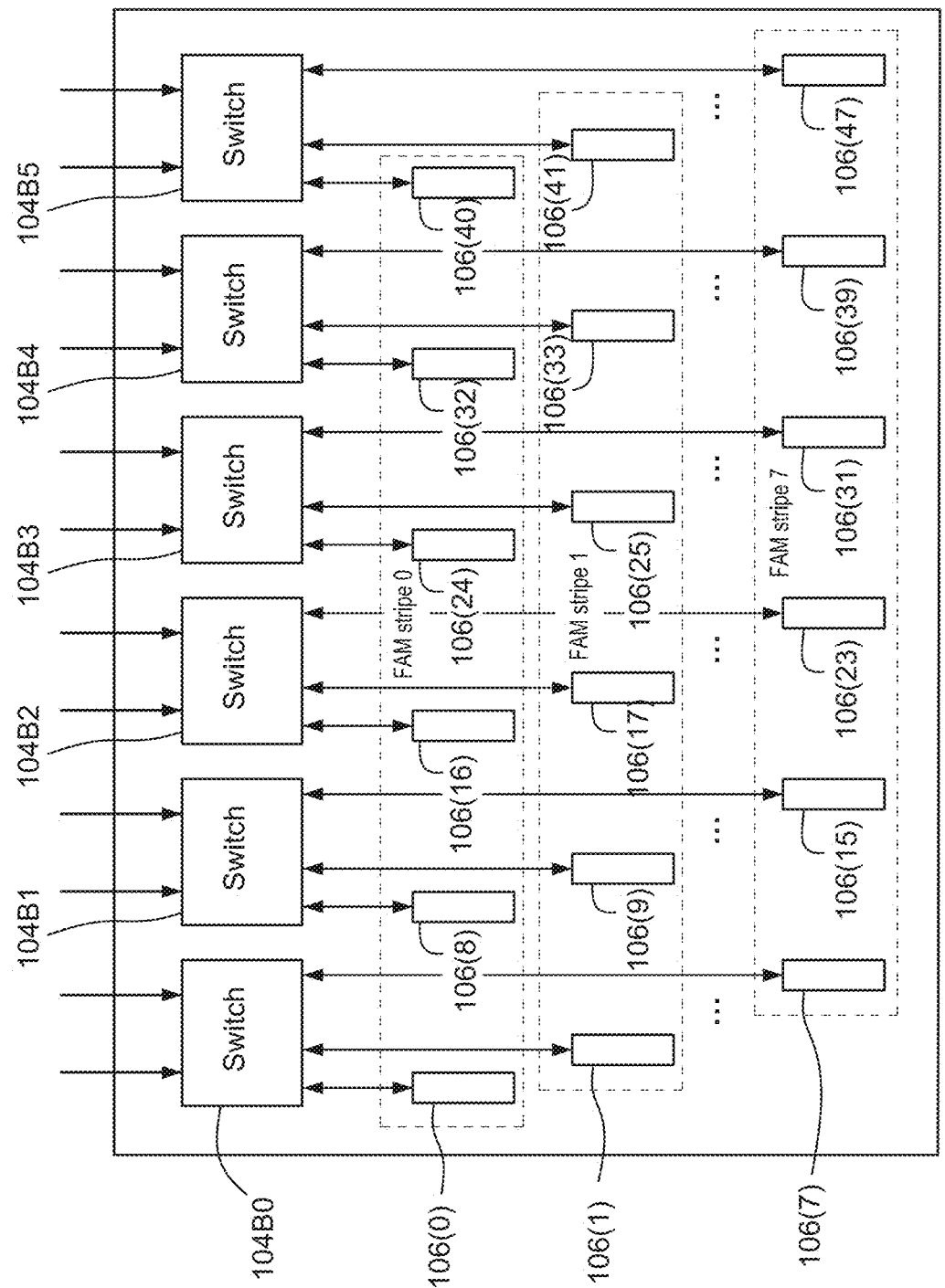
FIG. 4 shows example fabric attached memory striping.

The FAM system 100 herein supports such software—allocated memory striping. For example, in one example embodiment as shown in FIG. 4, software allocates FAMMs 106 to an application in the granularity of "stripes", where a stripe is stored across a collection of FAMMs 106. FIG. 4 shows an example with 8 FAMMs 106 per switch 104, enabling software to create eight 6-wide stripes of DIMMs or other memory. In a system with 8 GPUs 102, this provides a single stripe per GPU and two additional stripes that can be used by GPUs needing additional capacity. In general, software can allocate stripes of different widths on a given FAM Baseboard, though the more common configuration is uniform stripe widths as shown here. Stripes can be "horizontal" where a given switch 104 contributes a single FAMM 106 to the stripe, or "vertical" where a given switch contributes multiple FAMMs 106 to the stripe.

Collections of FAMMs can thus be attached to the fabric as a "stripe" to provide more total capacity or memory bandwidth to the source GPU, where the number of FAMMs comprising a stripe and the number of links over which accesses are made to the stripe can be configured by memory allocation software depending on the capacity and bandwidth needs of the application.

GPUs 102 in some applications may share the memory on a given stripe rather than having exclusive access to the stripe, and the switch 104 may support this through proper programming of routing tables (as explained below). If the GPUs 102 belong to separate virtual machines (for example in a cloud datacenter where the system is used by multiple tenants), then the non-interference property can help provide performance and error isolation among VMs/users. In particular, a given stripe may be constructed through design of the switching fabric and/or through programming of switch routing tables (see below) such that the stripe is dedicated to a single source GPU and/or a single VM; accesses from other GPUs or VMs are prevented through security checks in the switches. A given stripe may also be shared by multiple source GPUs running the under the same VM or by GPUs running under different VMs, depending on the data sharing model for the application. For either model—dedicated or shared stripes—techniques for congestion control such as injection-rate limiting can be employed in the source GPUS or switches to ensure that bandwidth to the set of FAMM stripes is shared equally among source GPUs.

Figure 5:
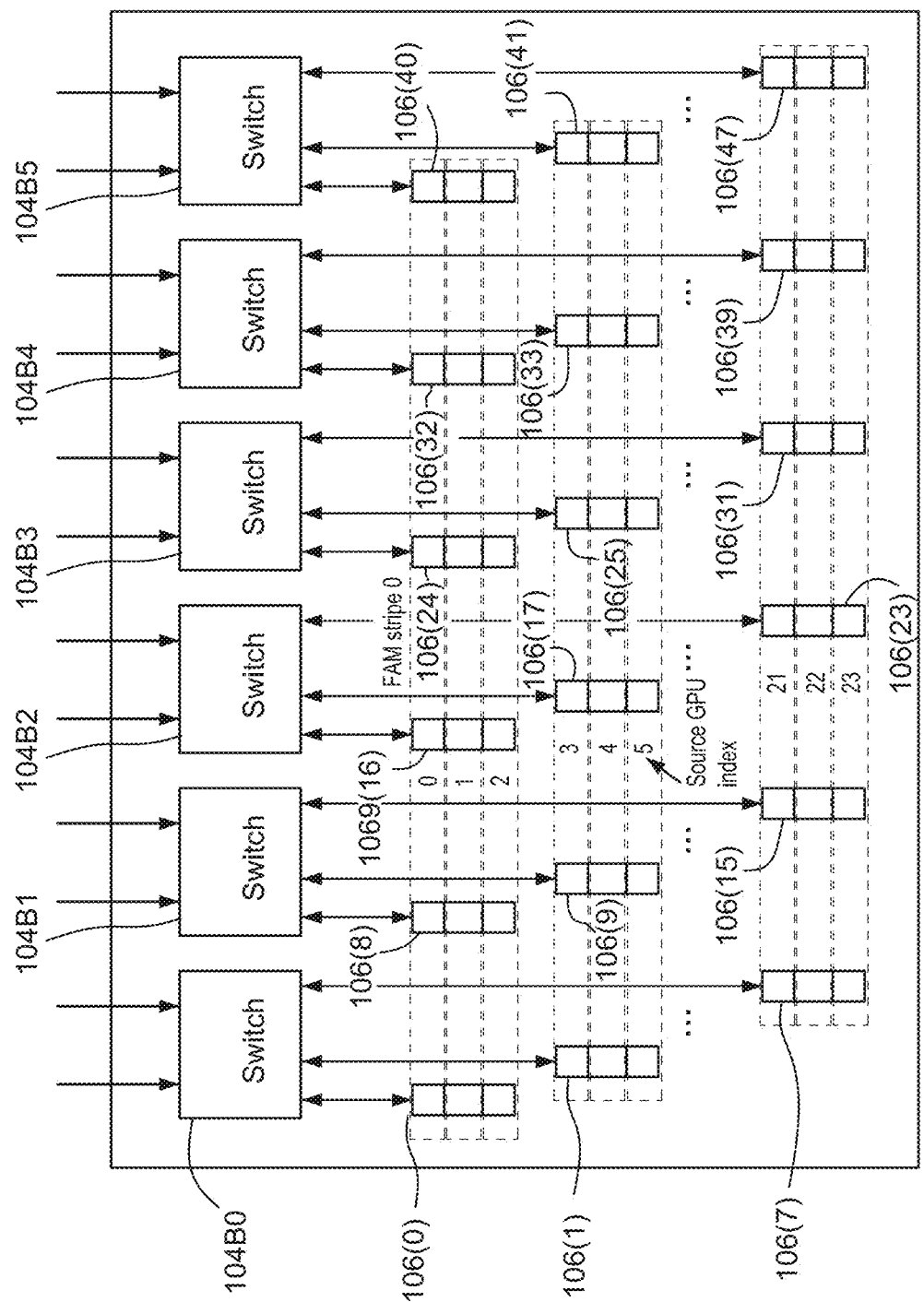
FIG. 5 shows example subdividing of stripes in FIG. 4 into logical stripes so each FAMM provides plural stripes.

As shown in FIG. 5, a FAMM 106 based stripe address space may be itself subdivided or partitioned to create multiple "logical stripes" within the same physical FAM memory. This is helpful, for example, in a multi-node system when the number of source GPUs 102 exceeds the number of stripes. In this sort of system, it is helpful to give each source GPU 102 a subset of a stripe's capacity. The subdivision of stripes is accomplished through programming of the source GPU 102 and the NVSWITCH™ 104 routing tables (see below in connection with FIG. 13-15 below) and does not impact the hardware function. In FIG. 5, a board contains eight 6-wide stripes, each sub-divided into 3 logical stripes. 24 source GPUs 102 each get a logical stripe. Of course the striping shown is merely a non-limiting example and other striping patters and or distributions are possible.

The capability of interleaving across multiple donors 106, creating a "stripe" of FAM, is valuable for performance because a source GPU 102's bandwidth to FAM is not limited by an individual FAMM 106's bandwidth to the fabric. Depending on how many source GPUs share a FAM baseboard, any given source GPU 102 can potentially saturate up to all of its links to the fabric in accessing FAM.

Note that the above-described concept of data stripes is independent from the hardware-based "spraying" concept discussed below. In particular, data stripes are selected and programmed by software (e.g., the application(s) running on a source GPU 102) and handled by routing tables, whereas "spraying" (e.g., as described in connection with FIG. 10 below) relates to how the example non-limiting embodiment efficiently communicates memory access requests across the interconnect fabric. In the example embodiments, the same routing tables (see FIGS. 14A, 14B, 15) that manage data striping (based on mapping physical interconnect addresses to particular FAMM 106 regions) also control additional data transformations that take into account "spraying" as well as disparities between the global address space size and the address space of individual FAMMs 106.

Example Non-Limiting Form Factor

System 100 can be implemented using any of a number of different form factors. However, some implementations may provide advantages in terms of cost and convenience. For example, in some non-limiting embodiments, multiple FAMMs 106 may be disposed on a common printed circuit board, thereby providing significant memory expansion by simply adding another single board to a system. In more detail, in one non-limiting embodiment, multiple FAMMs 106 may be placed together on a FAM baseboard ("drawer") which has the same form factor as the source GPU baseboard providing GPU 102 compute resources. A datacenter rack can for example be populated with a different mix of source GPU and FAM baseboards depending on the compute vs. memory requirements for the customer workloads it is running.

Figure 6:
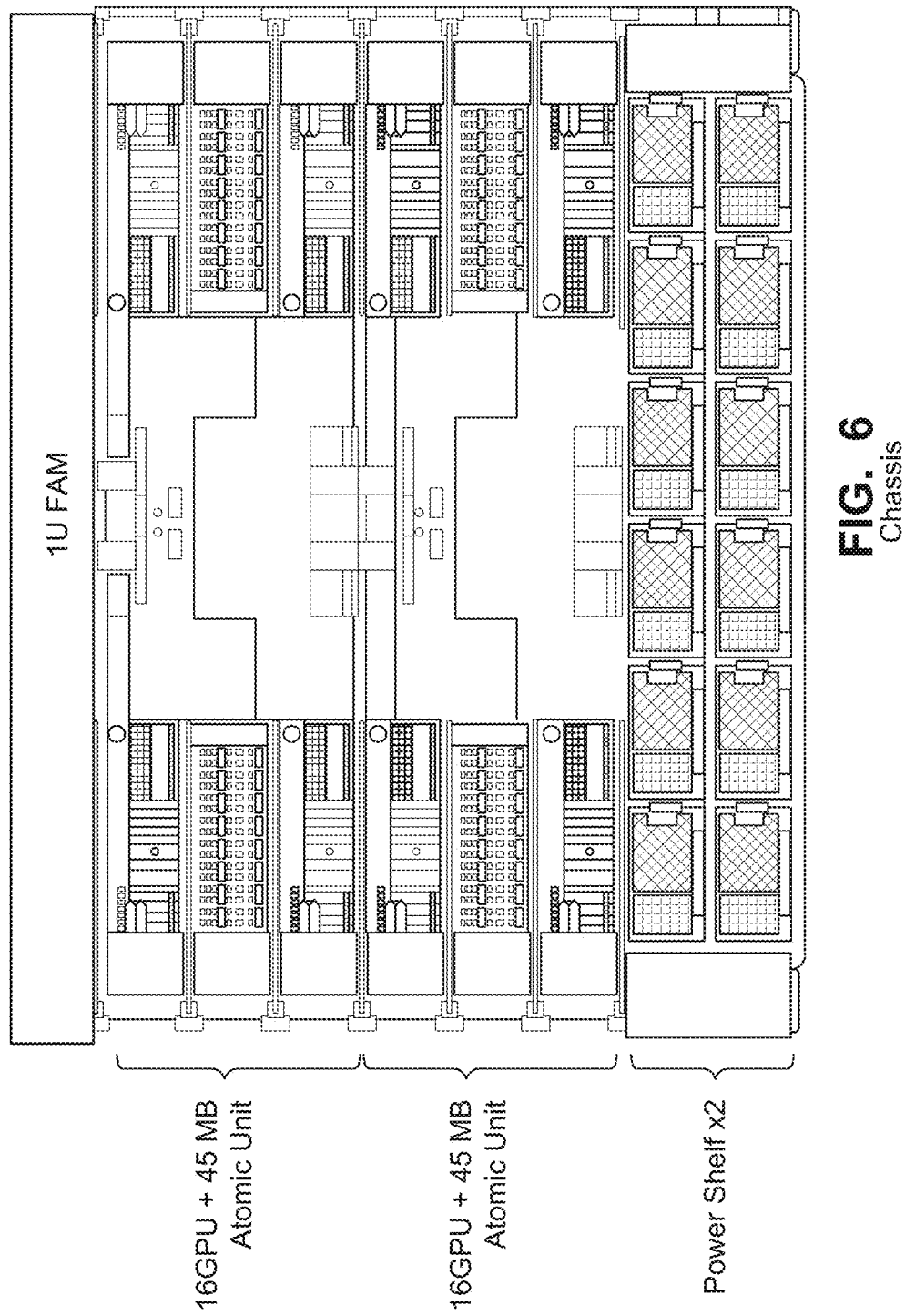
FIGS. 6, 7 and 8 show example non-limiting server or other chassis configurations.

FIG. 6 shows one example FAM chassis to give customers running big-data multi-GPU-accelerated applications the option of a larger memory footprint. In this embodiment, a dedicated FAM baseboard ("tray") is added on top of the GPU and CPU subsystems to create a memory-expanded system. The dedicated FAM baseboard may provide a number of FAMM devices and associated bundled high-performance memory. In this example, the FAM and GPU trays are designed as interchangeable so it's possible to swap compute for more memory or vice versa.

Figure 7:
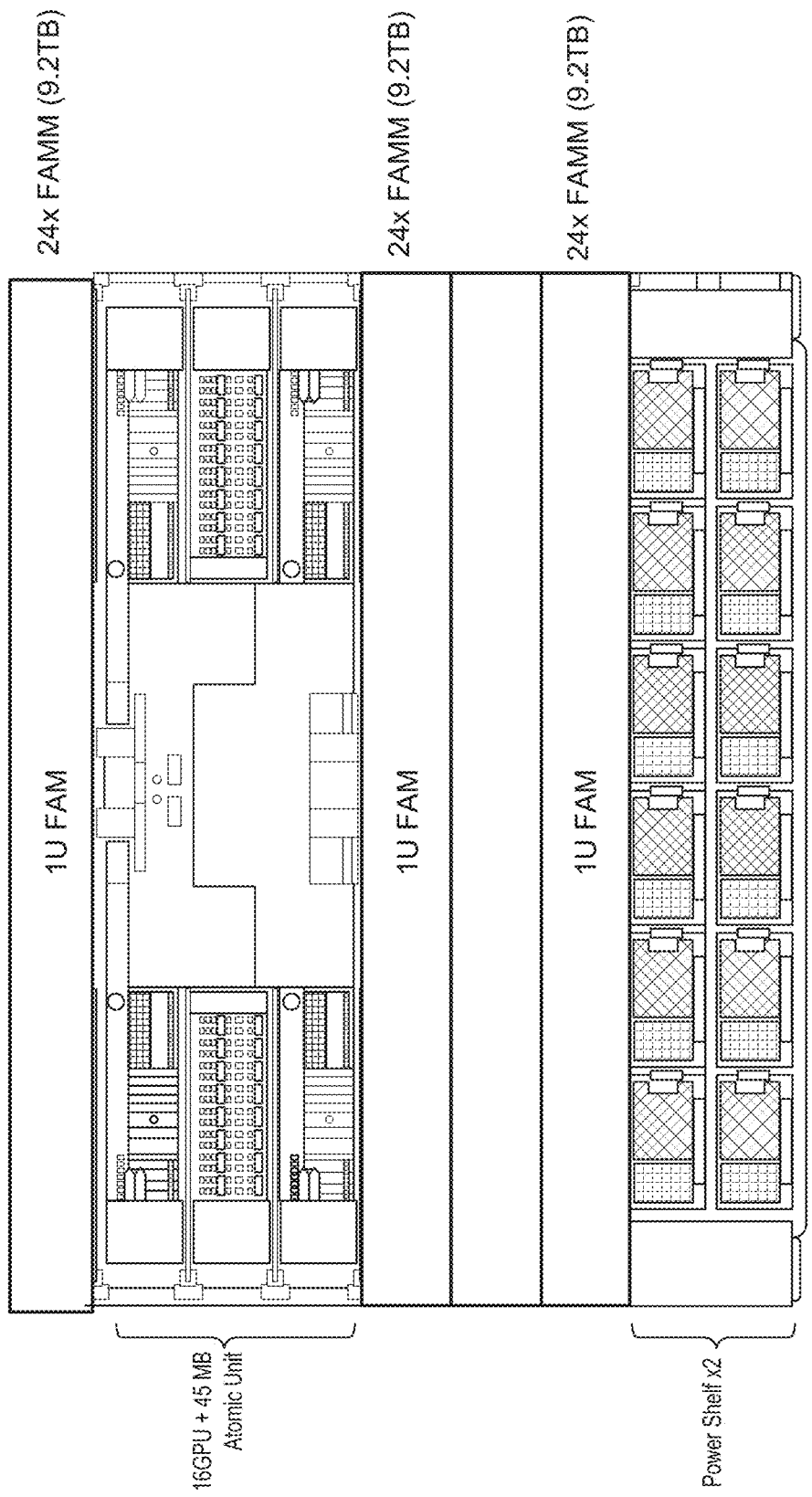
Figure 8:
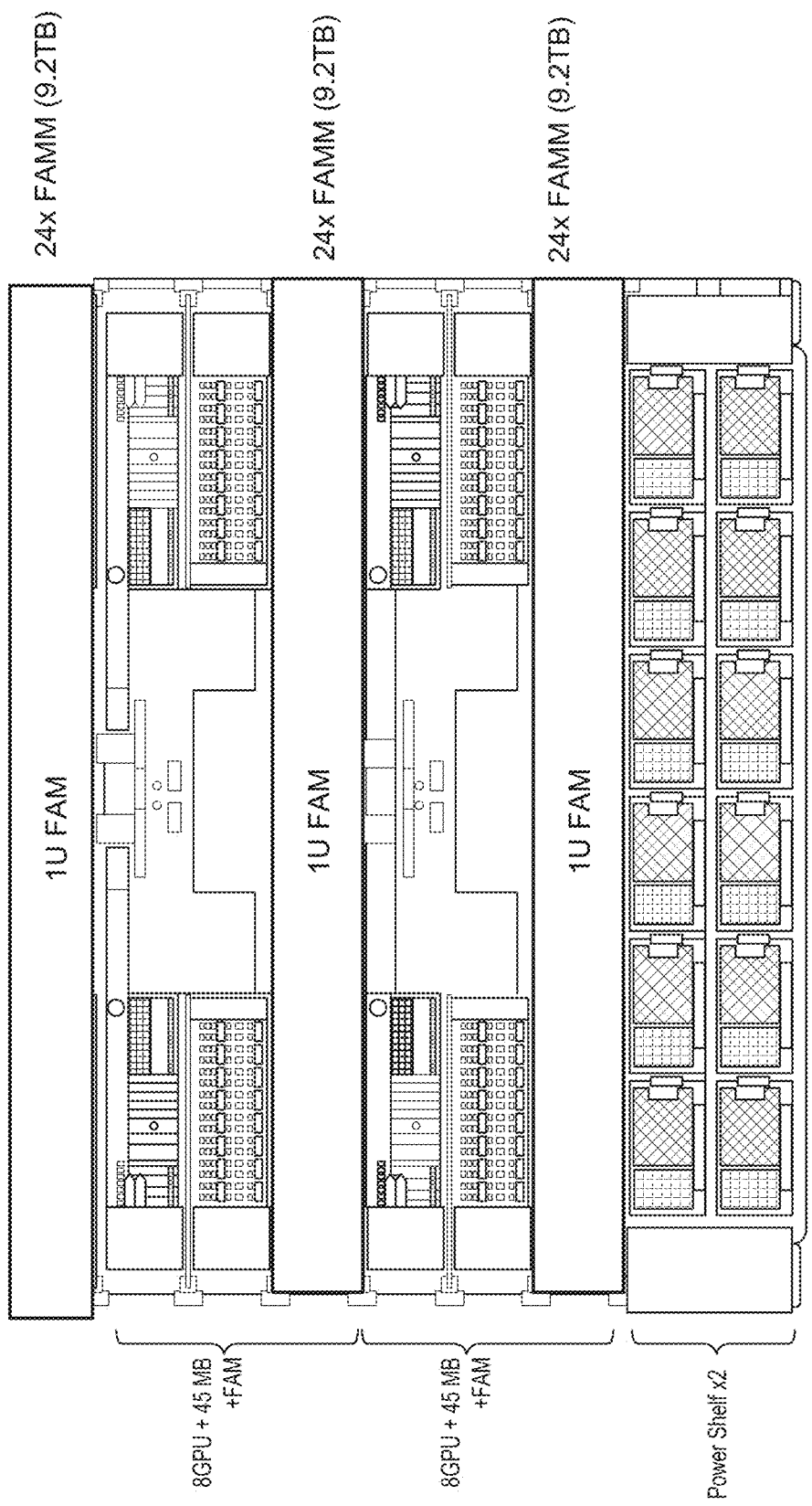

As a further example, consider a multi-GPU system of the type shown in FIG. 6 with a number of compute GPU Baseboards. FIGS. 7 and 8 show that many other configurations (e.g., mixtures of GPU baseboards and FAM baseboards) are possible. For example, it is possible to swap out one or more GPU baseboards and replace it/them with one or more FAM Baseboards. The FAM memory capacity is much larger than can be achieved with CPU DRAM or HBM (video memory), and the FAM memory bandwidth is much larger than possible through PCIe to sysmem. The value proposition is higher capacity and higher bandwidth than traditional system memory can provide. The FAM capitalizes on high bandwidth, low latency, high scalability of NVLINK™+NVSWITCH™ or other high bandwidth interconnect fabric. FAM delivers more memory without forcing customer to buy more GPUs or CPUs. FAM can also be virtualized in deployment—for example it is possible to allocate a "slice" of FAM per virtual machine (each compute GPU can support one or plural virtual machines).

Example Non-Limited Address Mapping/Transformations In the current GPU architecture, hardware is provided to translate between an application's virtual memory address and a physical memory address. Specifically, in one non-limiting embodiment, a Fabric Linear Address (FLA) is provided over the fabric interconnect and thus within an address space used by GPUs in different baseboards (nodes) communicating with each other through reads/writes/atomics. See for example U.S. application Ser. No. 16/198,649, filed Nov. 21, 2018, titled "Distributed Address Translation In A Multi-Node Interconnect Fabric," which discloses implementing a fabric linear address (FLA) space to provide a global virtual address space into which different processing nodes may uniquely map one or more ranges of local physical memory (see address mapping discussion below). In this way, shared local physical memory at a given processing node may be accessed by any other processing node or nodes through distinct and manageable address ranges within the FLA space. Example embodiments herein take advantage of FLA to allow GPUs 102 to reach across the interconnect fabric to access memory provided by FAMMs 106.

Figure 9:
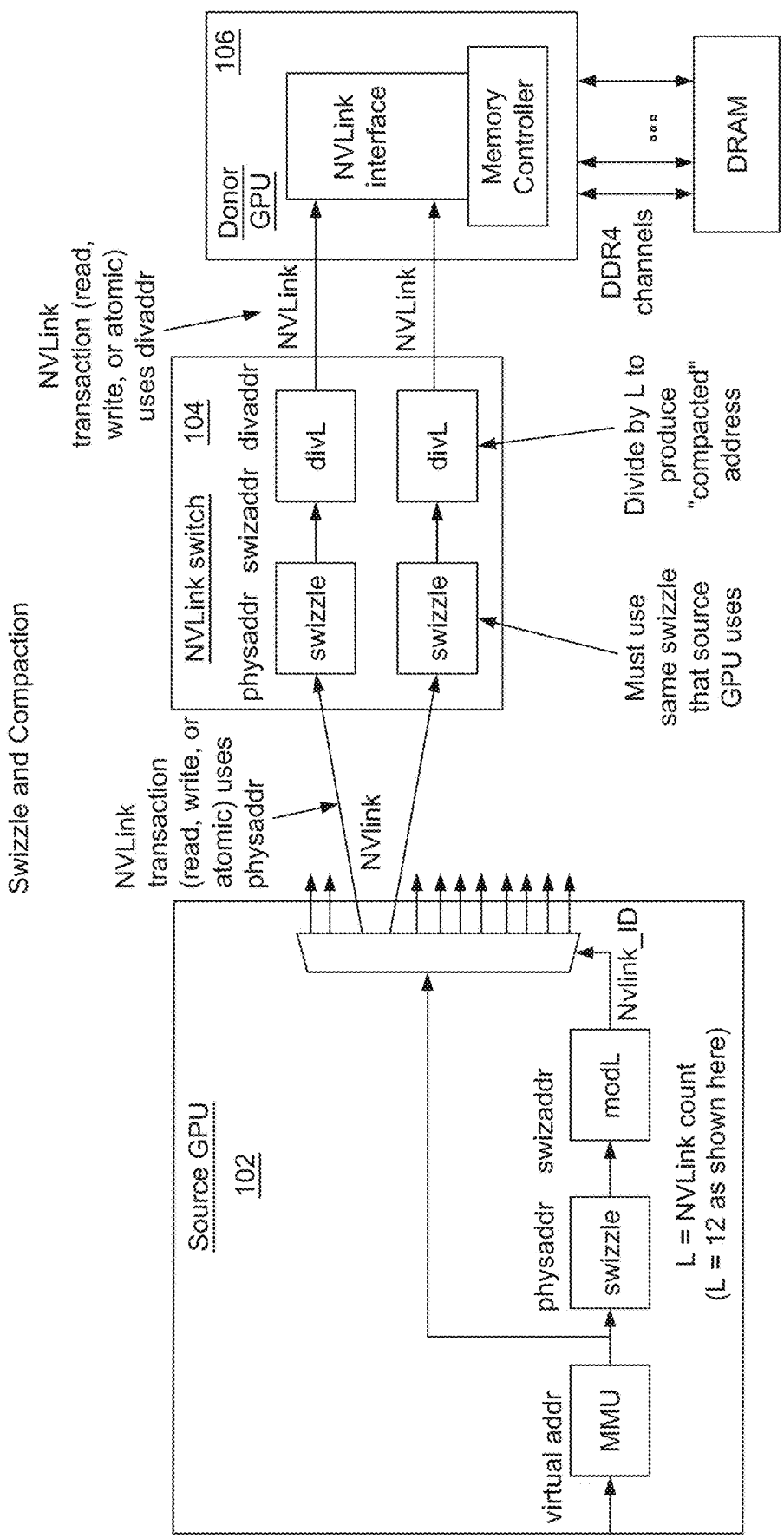
FIG. 9 shows example non-limiting address mapping.

As shown in FIG. 9, the source GPU 102 translates its address from one form to another, the switch 104 performs an additional address translation, and the donor GPU 106 performs a still additional address translation. In other embodiments, the address translation could be performed by the source GPU 102 rather than the switch 104 and the donor GPU 106; by the switch 104 rather than the source GPU 102 and the donor GPU 106; or by the donor GPU 106 rather than the source GPU 102 and the switch 104. Thus, in general, the address translation could be performed by one or the other GPUs and/or by the interconnect fabric itself, depending on the application and the context.

As will be explained below, example embodiments of the interconnect fabric and/or interfaces thereto provide hardware that performs several different kinds of address transformations:

(1) one transformation called "swizzle" uses entropy to select which NVlinks of the interconnect fabric a source GPU 102 uses to communicate or "spray" a memory access request over the interconnect fabric (the "swizzle" determines the spray pattern)—ensuring that the source GPU does not "camp" on any particular link but instead distributes its access requests across all available links; and (2) a transformation called "compaction" which compacts the holes in the memory space created by the address space interleave which makes more efficient use of the FAMM. Compaction takes into account differences in size between the address space of a source GPU 102 and the address space of a fabric attached memory, by dividing or "squeezing" (or in other embodiments, multiplying/expanding) the address the source GPU generates into a range of address values the FAMM 106 can accommodate.

The above transformations are theoretically independent (one could be used without the other), but if "swizzle" is used to transform the source GPU 102 addresses for purposes of link selection, the same or different component (e.g., the switch 104 and/or the FAMM 106) must, in one non-limiting embodiment, swizzle the address using the same algorithm as the source GPU before address compaction, in order to preserve one-to-one correspondence between addresses and unique memory locations in the FAM address space. In non-limiting examples, the fabric switch does the same swizzle as the source GPU does, and compaction operates on an unswizzled address. The swizzling done in the source GPU randomizes the link selection for a given address, but does not alter the actual address sent on NVLINK™ that the switch port sees.

Spraying and Swizzle Entropy-Based Address Transformation

In accordance with another example non-limiting advantageous feature, a source GPU 102 can use the full inter-GPU communication bandwidth for accessing fabric attached memory by interleaving the fabric attached memory accesses across multiple donor fabric attached memories. The source GPU is thus able to "spray" (interleave) memory accesses across multiple links/interconnects of the fabric attached to it to access an attached memory pool via a plurality of donor memory controller hardware units.

Figure 10:
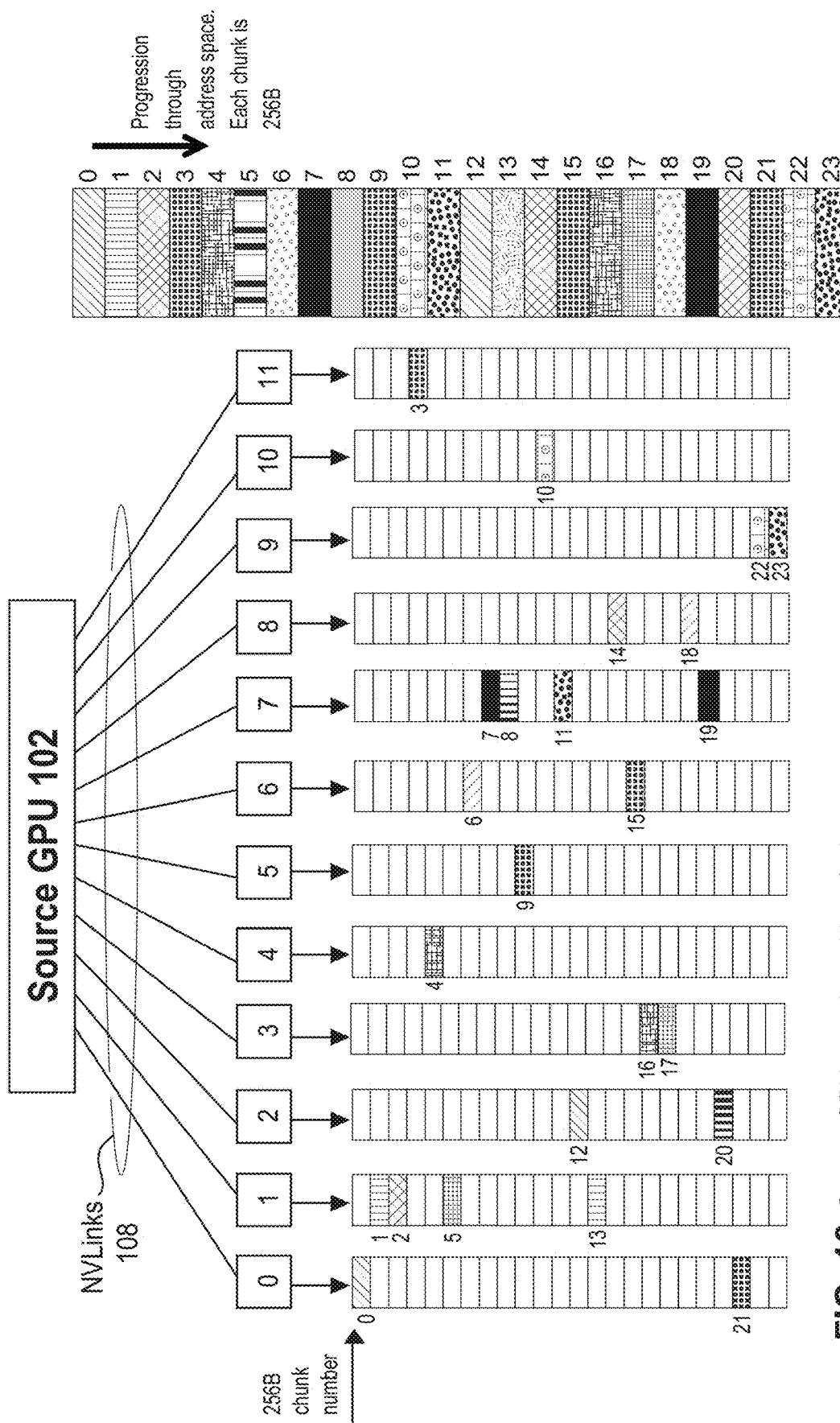
FIG. 10 shows example non-limiting source GPU "spraying" (interleaving) with an entropy-based link selection.

FIG. 10 shows how a source GPU 102 can interleave or "spray" its memory access requests across plural (in this case 12) different interconnect links 106. In example non-limiting embodiments, each such link/interconnect carries a subset of the address space, referred to as an "address plane." Those addresses direct the data to different FAM donor hardware 106 on the fabric attached memory connection circuitry. This allows the source GPU to use its full bandwidth while maintaining access to the full FAM address space. While spraying can help improve performance as compared to using a fixed stride across a number N of different links, other example non-limiting implementations could select fixed or variable strides, depending upon the application and associated need.

In more detail, access patterns by a given source GPU 102 can potentially be very regular or very erratic, depending on the work the GPU is doing. If the access pattern is regular, then depending upon how the memory accesses are strided, all those accesses could end up going out over the same link 108. If no precautions are taken, the source GPU 102 could end up "hot spotting" on certain links 108, which could overload some links while leaving other links idle. As FIG. 10 shows, to solve this problem, the source peer can be programmed to "spray" data across a programmable number of links 108. Thus, for example, the arrangement can work with only a single FAMM 106 peer, but if more FAMM 106 peers are available, the source GPU can randomly or pseudo-randomly spray its data across any or all of those FAMMs 106 and associated links.

Spraying has the effect of load-balancing memory traffic across the different links so that none are overwhelmed, and none are very underutilized. There are different ways of performing this spraying. For example, one technique is to take the address and shuffle it around or "swizzle" the address (see FIG. 11 block 210) to eliminate memory striding patterns that repeatedly hit on the same link or links 108 every time while rarely or never using other links. While such "swizzling" is itself known, the present technology implements it in combination with other techniques to provide unique advantages.

FIG. 9 shows that the source GPU 102 generates a virtual address (VA) which it applies to its memory management unit (MMU). If the MMU determines that the virtual address requires access over the interconnect fabric, the associated physical address is generated and "swizzled" to generate a swizzled address ("swizaddr"). A modulo-L operation responsive to the swizzled address (with L=the number of interconnect links available to the source GPU 102) determines an interconnect link ID ("Nvlink_ID") of the link 108 that will be used to send out the access request (in the example shown, there is no correspondence between address and link—any link can be used to send out any address). A multiplexer is then used to select the link 108 in response to the determined link ID and a data transmitter sends the address out over the selected link.

As a working example, suppose the donor GPU 102 is striding across a two MB page of memory. In example non-limiting arrangements, the source GPU would interleave its associated memory requests across its interconnected links. Meanwhile, there are, in example non-limiting embodiments, hardware components within the source GPU 102 that prevent "camping" on any particular link, and a "swizzle" function that randomizes address bits so the source GPU does not "hotspot" on a given link—all to the end of maximizing the use of link resources by preventing over- and underutilization of any particular link of the interconnect. In one non-limiting embodiment that is based on Galois math, a "swizzle" creates "entropy" by taking a range of address bits, multiplying each by a number in a pre-defined Galois "string", accumulating the products via XOR, and then ORing the result into a range of lower address bits to produce the swizzled address.

FIG. 10 shows an example result of such "swizzling." Assume that the source GPU 102 generates a sequence (0-23) of ascending addresses through the address space, each address addressing a 256B (or other sized) "chunk" or block of memory. The "swizzle" operation causes the memory access requests to be "sprayed" out of plural (in this case twelve) different links 108. In the example embodiment, a non-transformed physical address is sent over the link—not a "swizzled" or otherwise transformed address. Thus for example, the request for address 0 happens to be sent out over link 0 and the request for address 1 happens to be sent over link 1, but then the request for address 2 is sent over link 1 as well. The request for address 3 is sent over link 11, the request for address 4 is sent over link 4, the request for address 5 is sent over link 1, the request for address 6 is sent over link 6, the request for address 7 is sent over link 7, and the request for link 8 is also sent over link 7. And so on. The requests are "sprayed" in a random or pseudo-random fashion over all available links 108(0-11), distributing the requests across the various links so that no one link is underutilized and no one link is overloaded. This swizzling achieves faster access because the access requests are load balanced across the links.

In prior NVIDIA architectures such as VOLTA and TURING, such spraying was also performed when two GPUs 102 were communicating with each other peer-to-peer. However, in that situation, all the links from one GPU 102(a) were connected to the peer GPU 102(b). In the example non-limiting FAM embodiment herein as illustrated in FIG. 9, in contrast, only a subset of the links from a source GPU 102 are typically interconnected with any particular FAMM 106. For example, there may be 12 links 108 coming from the source GPU but only two links 110 connecting any particular one of a plurality of FAMMs 106. The source GPU 102 can thus spray its requests across multiple FAMMs 106, e.g., to six FAMMs each having two links 110. Since each individual link 110 is matched in bandwidth (at least in some non-limiting embodiments) with the GPU links 108, the 12 source GPU links 108 are communicating with 12 FAM links 108 connected to, collectively, six different FAMMs 108—with all links matched in bandwidth in the example embodiment.

Figure 11:
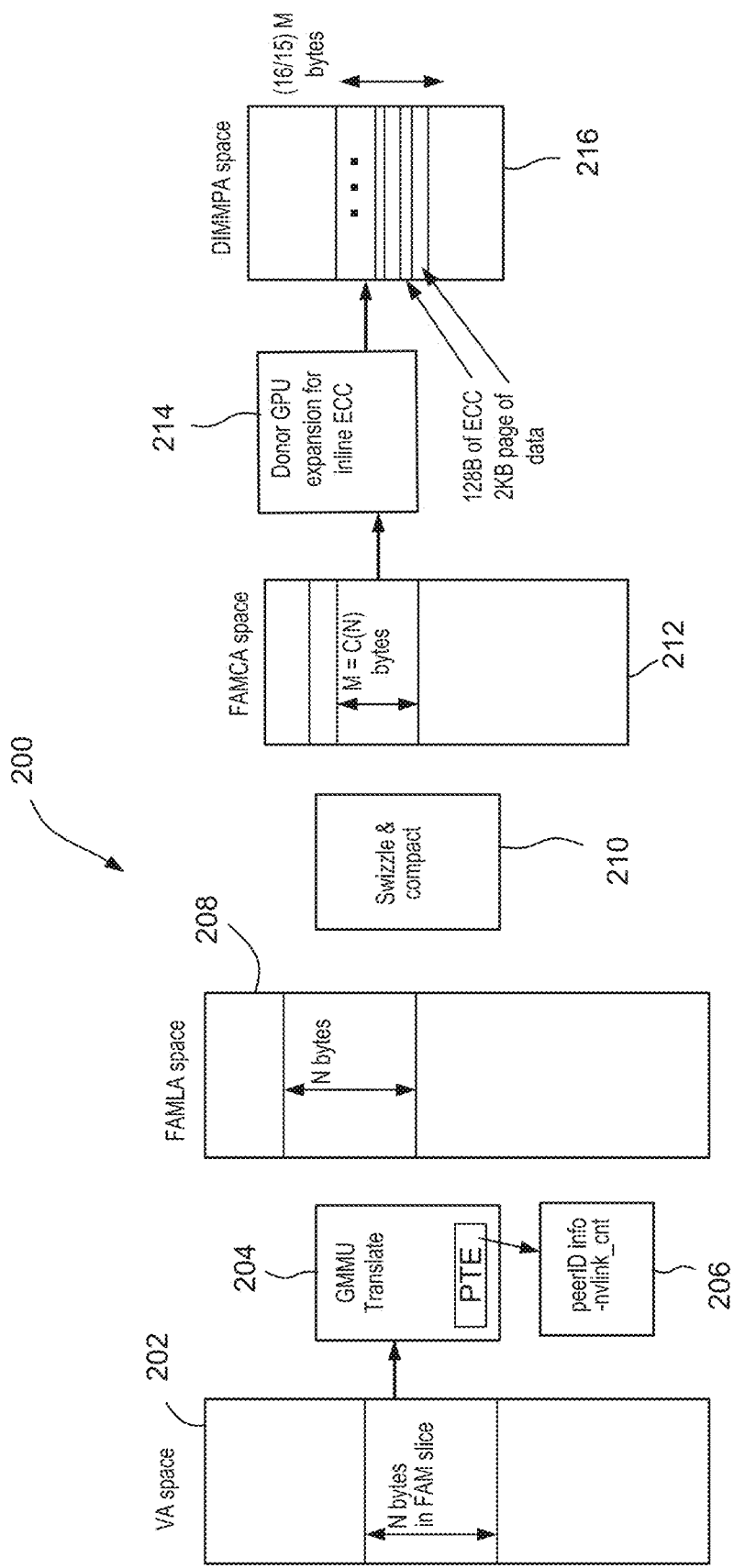
FIGS. 11 and 12 show example address translation.

FIG. 11 shows the corresponding different address spaces, with the virtual address (VA) space of the source GPU 102 depicted as block 202. The MMU translate operation (block 204) translates from the virtual address (VA) (block 202) specified by the application to a Fabric Linear (physical) Address (FLA) (or in this case the FAMLA space, i.e., the fabric attached memory linear address) (block 208) to be carried by the NVLINK™ switch fabric to the destination FAMM 106.

In example embodiments, a memory page is distributed across FAM DIMMs in a stripe depending on how a "peer aperture" (explained below) is programmed and how the interconnect fabric is constructed. The mapping may provide physical volumes with functional/performance isolation, each subdivided into logical volumes, per operating system instance. The application layers may use any of various memory allocation models. As described herein, the virtual address can be translated in a source GPU 102's MMU (memory management unit) to the page of physical address space striped over FAM. Implicitly, the memory pool is expanded for page migration via UVM oversubscription (described below), e.g., using a command such as cudaMallocManaged( ). When memory is allocated using the cudaMallocManaged( ) API, it can be migrated and evicted either on demand or by the system software in response to policies to/from memory mapped in FAM. The user application would need no modification to run on a physical system that has FAM and would just observe higher performance for GPU accesses to a working set that is larger than the capacity of the source GPU's memory. Explicitly, commands such as cudaMalloc( ) and a new CUDA driver API may thus be used to allocate/deallocate FAM as pinned memory. Resource Manager (RM) programs may source GPU's per-peer aperture FAM parameters. The Fabric Manager+RM may program NVSWITCH™ route tables. Software can also be used to enable memory page retirement due to uncorrectable errors. FAM donor error signaling for fatal errors in the donor or memory itself can be designed to provide enough information to indict a particular source GPU and/or VM so that software can perform "surgical" actions, taking down only the GPU or VM affected by the FAM errors while other GPUs or VMs are isolated from these actions.

The example non-limiting technology herein uses the construct of a "peer aperture" to allow a source GPU 102 to access fabric-attached memory 106. In some non-limiting examples, "peer" is a collection of reduced-capability GPUs or other memory controllers that are attached to a fabric-attached memory baseboard. In example non-limiting embodiments, the physical memory address in the NVLINK™ architecture is associated with what is termed an "aperture." That aperture gives the GPU 102 a window (see the indication "N bytes in FAM slice" in FIG. 11 block 202) into either system memory (attached to the CPU), into the memory of a peer (i.e., memory attached to another GPU, i.e., a peer) and connected to the NVLINK™ fabric or—in the present case—into the memory of a FAMM 106. The example non-limiting technology thus extends the concept of a peer aperture to access one or a collection of FAMMs 106. As FIG. 11 shows, the PTE identifies that the target is a peer, and points to a specific peer aperture, e.g., one of 8. A peer aperture register may be used to store/identify the number of the GPU 102's internal hubs to use to spray the traffic and the number of NVLinks 108 to use on each such internal hub. A per-peer aperture register thus controls the "spray" width.

Example Non-Limiting Swizzling & Compaction

As explained above, example non-limiting embodiments use entropy to interleave memory accesses across multiple FAMMs 106 and associated links 110. In the absence of any functionality provided by switch 104, the result would be multiple FAMM streams each of which access 1/N of the address space, where N is the number of FAMMs. This would imply that a given one of the FAMMs 106 will receive every Nth address. Without taking steps to modulate the address stream directed to a specific FAMM, this could result in low utilization on the FAMMs 106, i.e., utilization could be 1/Nth of the capacity the individual capacity the FAMM is capable of. This would be wasteful utilization of the FAM memory capacity.

More specifically, spraying that provides a one-to-one remapping from an original global FAM address to an interconnect address including a link ID causes the original addresses to fall into different "buckets" in a non-stride/regular intervals. If the original address is in the range of 1 . . . X and the interconnect address is also in the range of 1 . . . X, then we can divide the interconnect address space into chunks that map to the local address space of each FAMM 106.

Suppose for example that the fabric receives the original address (e.g., ranging from 0-12 GB) and a local address space of a FAMM 106 is much smaller (e.g., ranging from 0-2 GB). Due to the swizzling of the original address and selecting of a FAMM 106 based on the swizzled addresses, the result would be 2 GB's worth of original addresses being sent to a single FAMM 106, with the addresses being irregularly spaced out. For example, one FAMM 106 may get original addresses 0 KB, 256 KB, 320 KB, 448 KB, etc., but never original addresses 64 KB, 128 KB, 192 KB, 384 KB, etc. assuming that addresses fall on 64 KB boundaries.

To prevent this inefficient memory utilization, in some example non-limiting embodiments, at the FAMM 106 or in a switch 104 or other element that is part of the interconnection fabric, the original addresses are remapped (compacted) onto the FAMM's local address space as 0 KB, 64 KB (corresponding to original address 256 KB), 128 K (corresponding to original address 320 KB), 194 K (original 448 KB), etc. Or some other type of original address space to FAMM address space remapping is used to ensure that all of the available FAMM memory address space can be accessed using a global original address.

In some example non-limiting embodiments as shown in FIG. 9, the switch 104 divides the address down and removes "holes" to provide a linearized address space that matches or at least "fits into" the address space of a fabric attached memory 106. The switch 104 in some non-limiting embodiments is thus capable of taking an interleaved stream that has only one out of every L addresses and divide it down by the number of links L ("divL") so that the address stream coming out is linear, i.e., consecutive addresses. This provides full utilization of the FAM memory capacity. One example non-limiting embodiment thus uses a process of taking an address and manipulating it based on programmed FAM parameters such that the target FAM module sees linear address space without holes.

Figure 12:
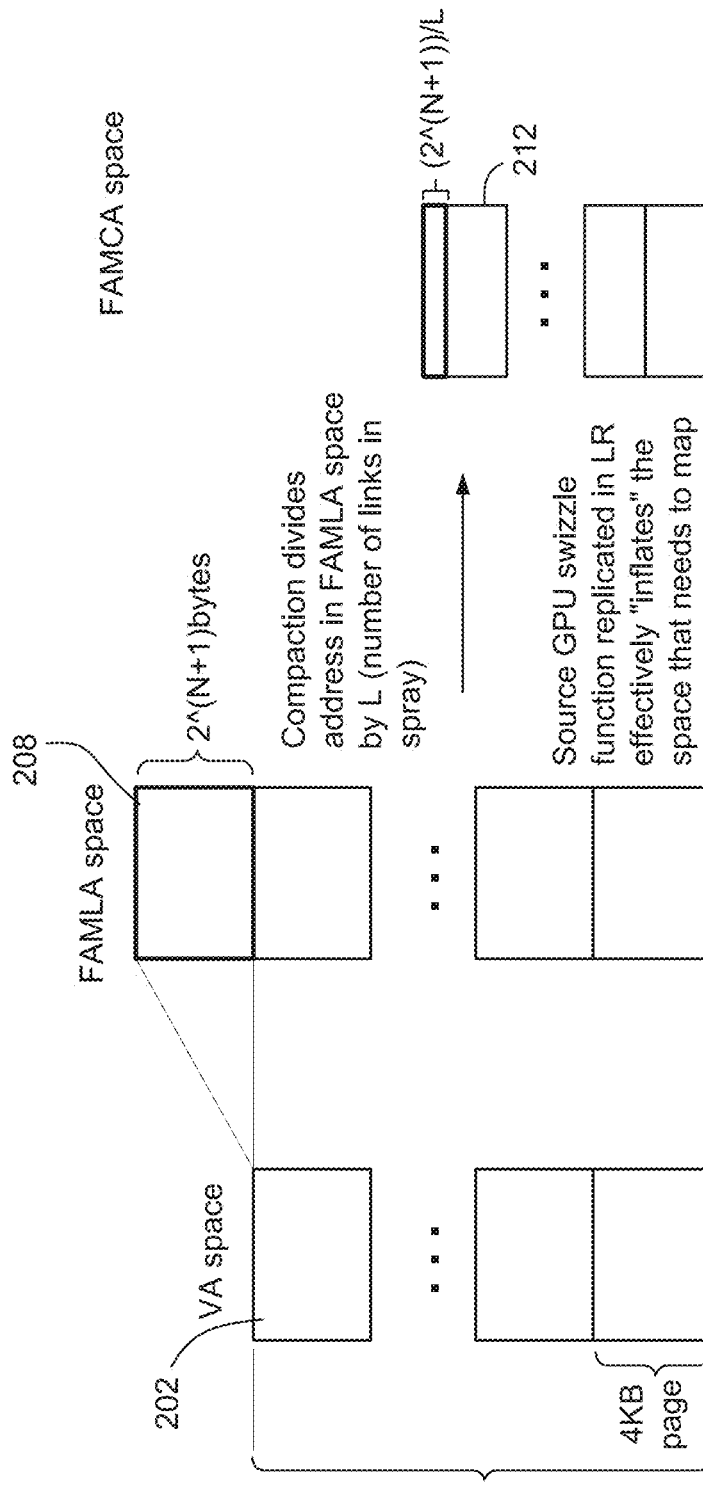

FIG. 12 illustrates the effect of the swizzle function on addresses, and specifically how the swizzle function in the source GPU 102 effectively modulates the stream of addresses that appear at a given switch port. FIG. 12 shows that the source GPU 102's swizzle replicated in the switch 104 or other part of the interconnect effectively "inflates" the space that needs to be mapped to account for the randomness introduced by the swizzle, and compaction is then used to divide the address in the FAM linear address space (FAMLA) by L (the number of links in the spray) in order to transform addresses into the FAM compacted address (FAMCA) space. In other words, the compaction operation performed on each swizzled address is:

FAMLA/L.

By way of further explanation, in example embodiments as shown in FIG. 9, the switch 104 performs a swizzle to create the same swizzling performed in the source GPU before address compaction. In example, embodiments, the switch 104 must match the GPU swizzle before compaction. As explained above, the swizzle performed within the interconnect fabric is based upon the source GPU's swizzle function—namely a function performed in source GPU 102 to distribute addresses randomly across a set of paths in order to reduce unequal use of a particular path or subset of paths (camping) due to characteristics of address stride pattern. In non-limiting embodiments herein, the interconnect fabric (or, in other embodiments, the FAMM) reverses the swizzle the source GPU 102 performs before compaction in order to prevent address conflicts.

In example non-limiting embodiments, the initial swizzle performed by the source GPU (intentionally) produces a non-linear distribution of addresses across the various links. However, the address which is placed on any particular link is the original address. If the already-swizzled addresses were simply compacted without considering that they have already been randomly or otherwise non-uniformly distributed across the address space, at least some kinds of compaction will cause collisions.

In one example embodiment, the address received by the switch 104 is the raw (unswizzled) address. Prior to compaction the switch 104 needs to transform the address (swizzle) matching the GPU, to put the address into the proper form to produce a bijective map.

As one example Address Transformation and Compaction, let's assume that there is only one source GPU 102 that generates accesses to a plurality of FAM donors 106, e.g., via 12 links 108 to six FAMMs 106, each of which is connected to a pair (2) of links 110. Suppose that the source GPU 102 is producing an address of for example between 0 and 12 GB. Suppose that each FAMM 106 has 2 GB of memory. Here, the address generated by the source GPU 102 will be within the range 0-12 GB, whereas the address range of each of the donors 106 is within a range of 0-2 GB. In some example non-limiting embodiments, the source GPU 102 will randomize distribution of request transmissions across its 12 links 108(0)-108(11), in order to load balance utilization of the 12 links. Assuming the request is a memory read or write, it will place the memory address on that selected link, this memory address specifying an address within the 0-12 GB address space. However, this particular selected link is connected only to a FAMM 106 which has an address space of 0-2 GB.

Therefore, in one example non-limiting embodiment as shown in FIG. 9, an intervening switch 104 accesses what FAMMs 106 are connected to it and what address range expectations those FAMMs have. A FAMM 106 in this particular case has an expectation of receiving an address with 0-2 GB, so the switch 104 transforms the original address so it is within the FAMM's address space. For example, if the source GPU 102 produces an address in the 6 GB range, it is desirable for switch 104 to transform it so that it is within the 0-2 GB range that a FAMM expects. Switch 104 thus determines, based on the address received from the source GPU 102 and the link 108 over which it is received, that the request is intended for FAMM 106(*i*), and that FAMM 106(*i*) is expecting an address within a 0-2 GB range. Switch 104 therefore changes the address so it fits within the memory address window of the FAMM 106(*i*) that is going to handle the access request. See FIGS. 11 & 12.

As shown in FIG. 9, switch 104 "undoes" the randomized link selection/swizzle performed by the source GPU 102 before this compaction (division) occurs. Otherwise, the non-linearities in the original source GPU 102's link selection can result in memory address collisions. This is because on the source GPU 102's side, there is no linear striding of memory addresses such that all memory accesses within a first memory range are sent over a first link 108(00), all memory access was within a second memory address range are sent over a second link 108(01), and so on. To the contrary, in some embodiments the source GPU 102 intentionally prevents any such 1-to-1 correspondence from occurring in order to load balance utilization of the different links 108. Because the source GPU 102 randomizes link selection, each of its connected links can potentially see an address within the 0-12 GB range. However in the example non-limiting embodiment, not every link 108 is going to every donor 106 because of, in some example non-limiting embodiments, the non-symmetry between the (e.g., larger in some embodiments) number of links 108 connected to the source GPU 102 and the (e.g., smaller in such embodiments) number of links 110 connected to each FAMM 106.

In one example non-limiting embodiment, the switch 104 may perform address swizzling and then compaction in an ingress module of switch 104 for access ports (connected to the source GPU 102). Such ingress module may include routing tables (see FIG. 13) programmed with the parameters of the FAM target and the fabric between the source GPU 102 and the target FAMM 106. The switch 104's port at the first hop (connected to the source GPU 102) uses this information to manipulate the interconnect address it receives such that a linear address stream is presented to each FAMM 106. In addition to "compacting" the address (e.g., dividing it down by the number of links over which the source GPU interleaves requests), the switch 104 can also apply offsetting (adding a fixed offset to the compacted address) and masked rewrite operations on portions of the address. These operations can be valuable for relocation when the FAM is shared by multiple guests in a virtualized system. The FAMM 106 may also be configured to do address validation and translation of the incoming address if a Fabric Linear Address (FLA) feature is enabled in the fabric.

Example Interconnect Fabric Routing

Figures 13, 14A:
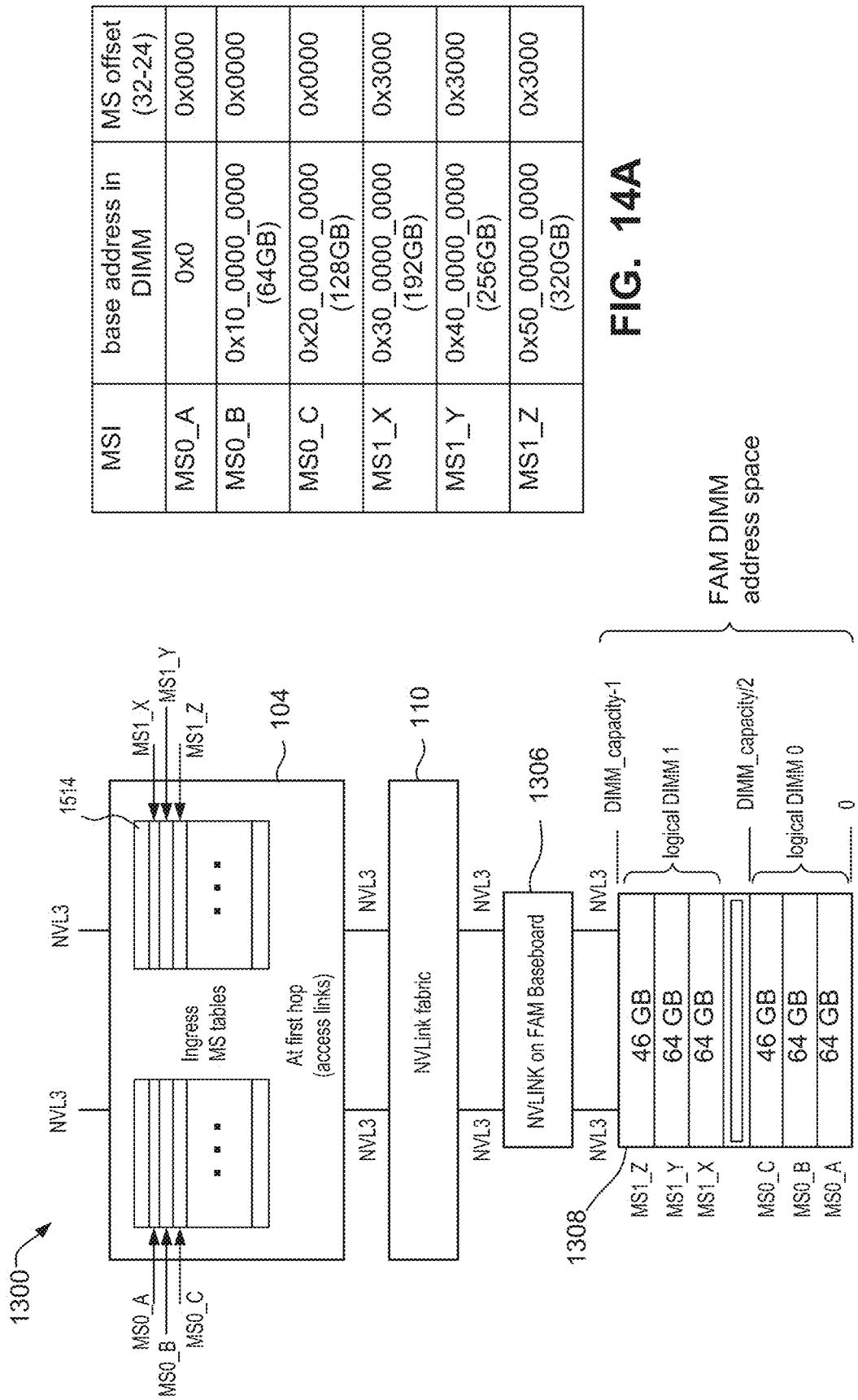

In example non-limiting embodiments, switch 104 provides routing tables that are used to map the physical address the source GPUs 102 provide over the interconnect fabric. These routing tables provide routing to destination FAMM 106 targets designated by software-specified "TgtID" information as well as how to perform compaction. Such routing tables in one example embodiment are based on "map slot" entries—and specifically such mapslot entries in a level 1 switch 104 ingress port route remap table 1302. FIG. 13 is a block diagram showing such example routing tables, which can be used to enable data striping as discussed above and also ensure that address transformations through the interconnect fabric are handled appropriately. In some non-limiting embodiments, route table address remapping is used to disambiguate convergent planes.

In the FIG. 13 example, switch 104 maintains an ingress routing table 1514 for each incoming link 108. The routing table 1514 includes information used to map incoming physical addresses to FAMMs 106—including control information for selectively performing swizzling/compaction. Such information is provided within the ingress routing table 1514 because the switch 104 in one embodiment is not dedicated to accessing FAMM 106 and therefore is controlled to selectively perform the transforms described above or not perform particular transforms depending on whether a memory access instruction is destined for a FAMM or for a peer other than a FAMM. Additionally, in example non-limiting implementations, the switch 104 routing table 1514 can be used to specify whether base and/or limit checks should be performed on the incoming address (this is useful as a security feature in cases of FAMM 106 partitions providing irregularly-sized storage capacities, e.g., 46 GB as opposed to 64 GB if 64 GB is the range mapped by the Map Slot, to ensure there is no unauthorized access to FAM). As discussed above, the swizzled address passes through a mod L function, where L is the number of links over which spraying is done. In one particular non-limiting example, the swizzle can therefore increase the address range seen by a given port by up to $2^{(N+1)}-1$ bytes (see FIG. 12), beyond the range that a regular (non-swizzled) interleave across the ports would produce, where N is the index of the highest-order bit manipulated by the swizzle to select a port. In one example non-limiting embodiment, N depends on L, and never exceeds 11, so that maximum increase of the Map Slot Limit is 2^12=4 KB. This "slop" in the Limit value can be accounted for in software memory allocation. Practically speaking, however, if the Map Slot Base and Limit fields have a granularity of 2^20=1 MB in this particular non-limiting example embodiment, this implies the "slop" is really 1 MB.

Still additionally, one example non-limiting feature of the example embodiments uses the routing tables 1514 to program a "shuffle" mode to perform a perfect shuffle of compacted addresses from plural link 108 ports servicing different (e.g., even and odd) memory planes and whose traffic converges on the same FAMM 106, in order to prevent collisions in addresses from the plural ports. Use of "shuffle" can reduce the number of open pages in DRAM. An alternative or additional technique is to use the programmable offset in the routing tables 1514 that can be selectively applied (e.g., added) to create different fixed partitions in the address space of a FAMM 106, the different partitions corresponding to different link 108 ports.

As shown in FIGS. 14A & 14B, the routing tables within switch 104 based on consecutive Map Slots can be used to map the entire address space of the DIMM with usable DIMM capacity within a FAMM 106. In the FIG. 14A example shown, the switch 104 uses the routing table information to map addresses associated with requests received on two different incoming link 108 ports into the DIMM address space of the same FAMM 104. This diagram shows map slot programming with no swizzle or compaction for simplicity in illustration. However, the base and/or limit checking may be performed for MS0_C and MS1_Z since these mappings are for less than a "full" (in this case, 64 GB) region in this particular example. Thus, Base/Limit checking can be disabled on a per Map Slot basis, and for FAM the expectation is that it is disabled for all Map Slots that fully map the FAM target; it is in some embodiments enabled only for Map Slots for which 64 GB range is not fully mapped by the underlying FAMM.

Note the example map slot offsets (which may be added to the physical addresses) for the mappings specified by MS1_X, MS1_Y and MS1_Z in the examples shown to enable the mapping to span the maximum DIMM range (in one particular example, 1 TB with 16 MB granularity). More efficient address space packing could be done—this is just an example.

Figure 15:
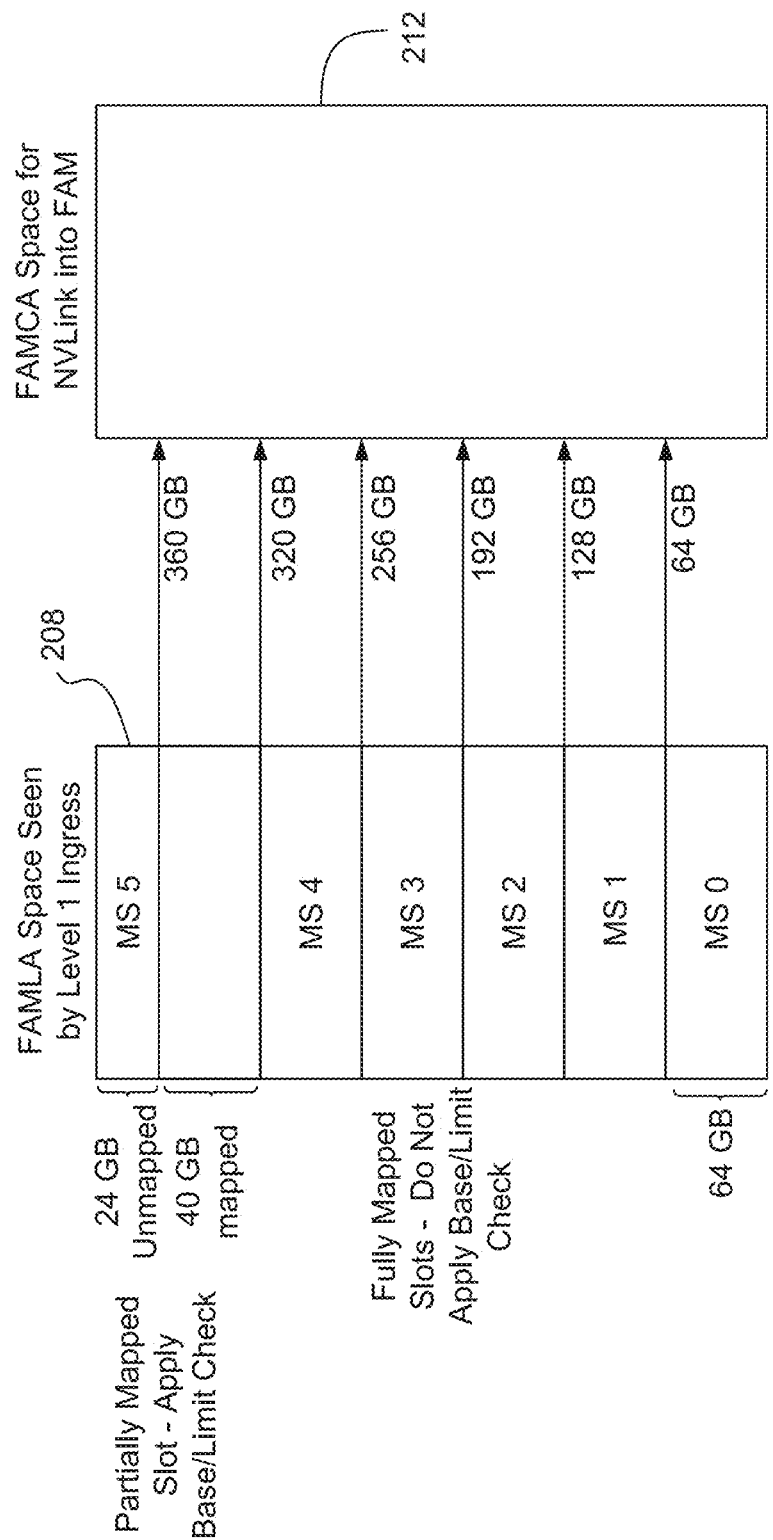
FIG. 15 shows a more detailed non-limiting map slot programming.

FIG. 15 illustrates a simple example of how map slots for a given switch 104 ingress routing table could map from the FAM linear address (FAMLA) space seen by the source GPU and the FAM compacted address (FAMCA) space seen at the link 110 input to the FAMM 106. In this example, there is no compaction going from FAMLA to FAMCA because the source GPU 102 uses only a single link to communicate with this particular FAMM 106.

Figure 16:
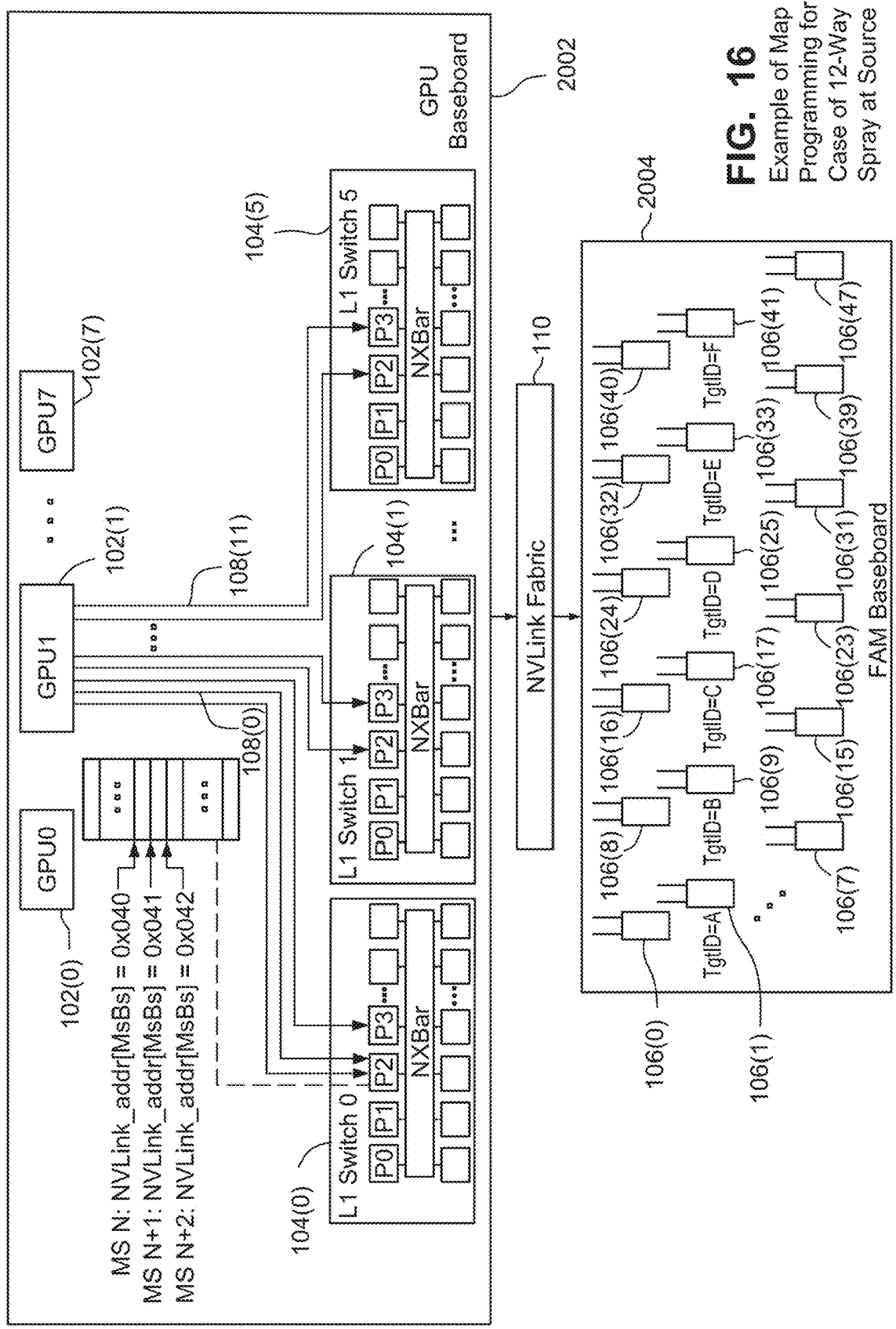
FIG. 16 shows a map slot programming example assigning target FAMM IDs.

In example non-limiting embodiments, the switch routing tables can further include software-programmable destination Target ID ("TgtID") fields that specify/assign destination FAMMs 106 for particular address ranges. FIG. 16 shows an example where source GPU 102 sprays traffic over 12 links 108, meaning that switch 104 needs to compact to transform the FAMLA linear address space to the FAMCA compacted address space. In this example, consecutive map slots can be programmed for each level 1 switch 104 on the GPU baseboard, where each level 1 switch emits traffic over two of its egress ports 108 (directed by a "TgtID" programming in the Map Slot) to a given column of a 6-wide slice of FAM allocated to the source GPU.

Figure 17:
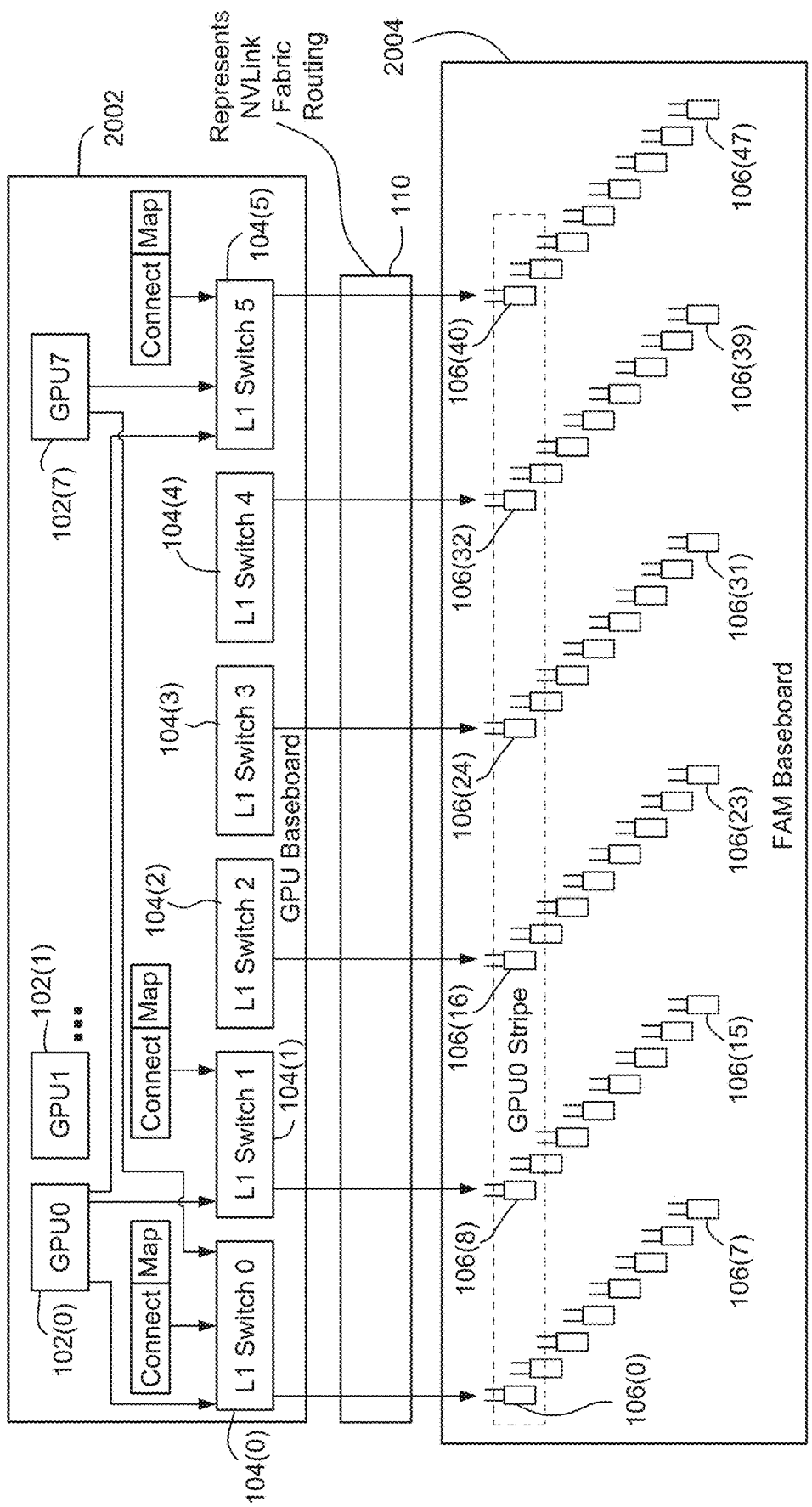
FIG. 17 shows an example non-limiting identifier assignment for FAMMs and their reflection in interconnect fabric routing map slots.

FIG. 17 shows an example of how "TgtID" map slot programming might be assigned to the FAMMs 106 on a FAM baseboard, assuming (in this particular example) 48 FAMMs 106 where each FAMM 106 is assigned a unique TgtID value programmed into the L1 switch Map Slot routing table.

Example Non-Limiting Parallel Processing GPU Architecture for Performing the Operations and Processing Described Above An example illustrative architecture which can benefit from fabric attached memory will now be described in which the above techniques and structures may be implemented. The following information is set forth for illustrative purposes and should not be construed as limiting in any manner. Any of the following features may be optionally incorporated with or without the exclusion of other features described.

Figure 18:
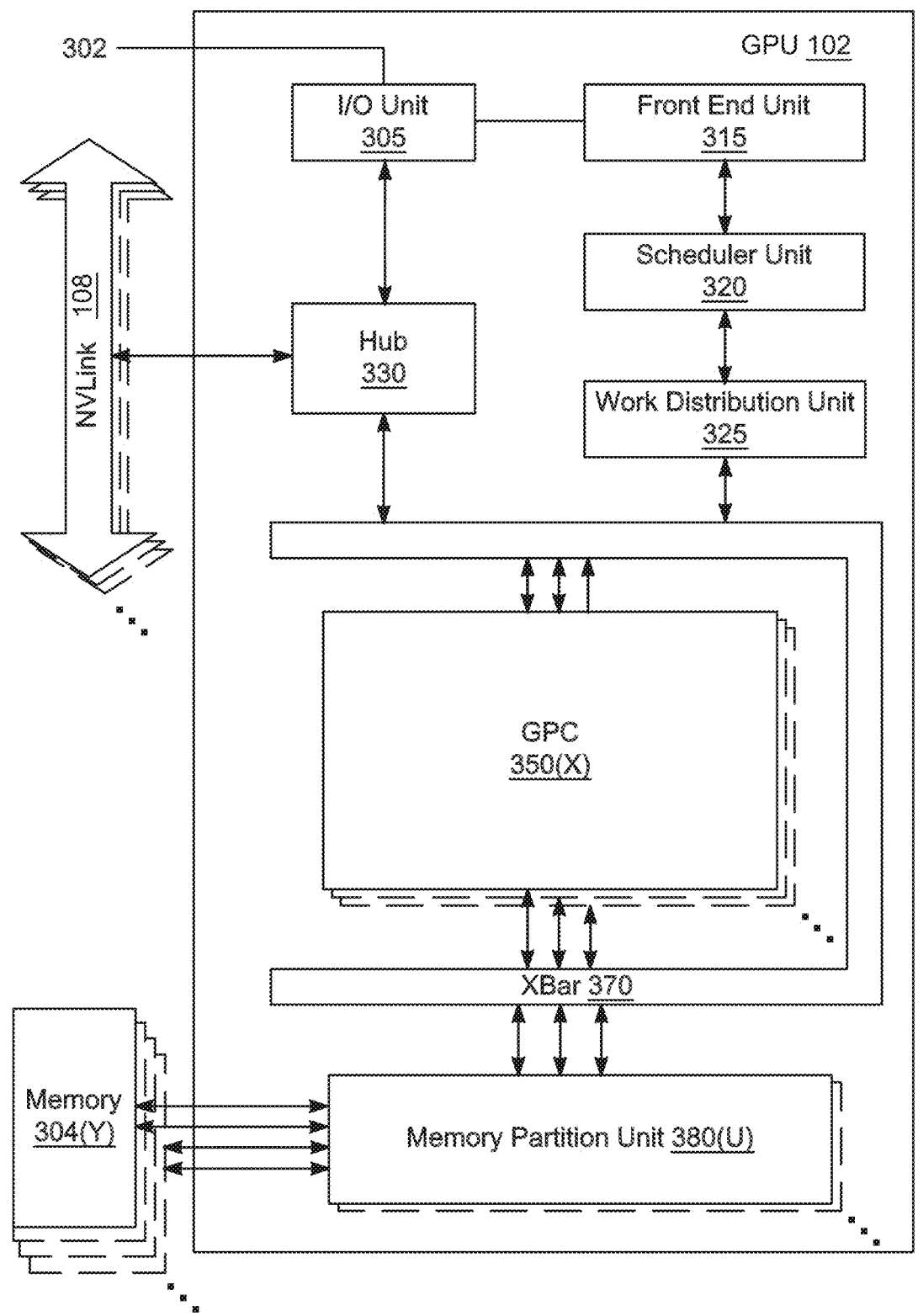
FIG. 18 illustrates an example GPU.

FIG. 18 illustrates that GPU 102 shown in FIG. 1 can be implemented as a multi-threaded multi-core processor that is implemented on one or more integrated circuit devices. The GPU 102 is a latency hiding architecture designed to process many threads in parallel. A thread (e.g., a thread of execution) is an instantiation of a set of instructions configured to be executed by the GPU 102. In an embodiment, the GPU 102 is configured to implement a graphics rendering pipeline for processing three-dimensional (3D) graphics data in order to generate two-dimensional (2D) image data for display on a display device such as a liquid crystal display (LCD) device. In other embodiments, the GPU 102 may be utilized for performing general-purpose computations.

As discussed above, one or more GPUs 102 as shown may be configured to accelerate thousands of High Performance Computing (HPC), data center, and machine learning applications. The GPU 102 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 18, the GPU 102 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The GPU 102 may be connected to a host processor or other PPUs 300 via one or more high-speed NVLINK™ 310 interconnects forming an interconnect fabric including fabric attached memory as discussed above. The GPU 102 may be connected to a host processor CPU 150 or other peripheral devices via a further interconnect(s) 302 (see FIG. 2). The GPU 102 may also be connected to a local high-performance memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device. The same or similar such memory devices are included in each FAMM 106.

The NVLINK™ 108 interconnect enables systems to scale and include one or more PPUs 300 combined with one or more CPUs 150, supports cache coherence between the PPUs 300 and CPUs, and CPU mastering. Data and/or commands may be transmitted by the NVLINK™ 108 through the hub 330 to/from other units of the GPU 102 such as one or more copy engines, a video encoder, a video decoder, a power management unit, etc. (not explicitly shown). The NVLINK™ 108 is described in more detail in conjunction with FIG. 22.

The I/O unit 305 is configured to transmit and receive communications (e.g., commands, data, etc.) from a host processor 150 over the interconnect 302. The I/O unit 305 may communicate with the host processor 150 directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the GPU 102 to perform various operations. The I/O unit 305 transmits the decoded commands to various other units of the GPU 102 as the commands may specify. For example, some commands may be transmitted to the front end unit 315. Other commands may be transmitted to the hub 330 or other units of the GPU 102 such as one or more copy engines, a video encoder, a video decoder, a power management unit, etc. (not explicitly shown). In other words, the I/O unit 305 is configured to route communications between and among the various logical units of the GPU 102.

In an embodiment, a program executed by the host processor 150 encodes a command stream in a buffer that provides workloads to the GPU 102 for processing. A workload may comprise several instructions and data to be processed by those instructions. The buffer is a region in a memory that is accessible (e.g., read/write) by both the host processor 150 and the GPU 102. For example, the I/O unit 305 may be configured to access the buffer in a system memory connected to the interconnect 302 via memory requests transmitted over the interconnect 302. In an embodiment, the host processor 150 writes the command stream to the buffer and then transmits a pointer to the start of the command stream to the GPU 102. The front end unit 315 receives pointers to one or more command streams. The front end unit 315 manages the one or more streams, reading commands from the streams and forwarding commands to the various units of the GPU 102.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the GPU 102 to other units of the GPU 102. For example, the XBar 370 may be configured to couple the work distribution unit 325 to a particular GPC 350. Although not shown explicitly, one or more other units of the GPU 102 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLINK™ 108. In an embodiment, the GPU 102 includes a number U of partition units 380 that is equal to the number of separate and distinct memory devices 304 coupled to the GPU 102. A partition unit 380 will be described in more detail below in conjunction with FIG. 20.

In an embodiment, a host processor 150 executes a driver kernel that implements an application programming interface (API) that enables one or more applications executing on the host processor to schedule operations for execution on the GPU 102. In an embodiment, multiple compute applications are simultaneously executed by the GPU 102 and the GPU 102 provides isolation, quality of service (QoS), and independent address spaces for the multiple compute applications. An application may generate instructions (e.g., API calls) that cause the driver kernel to generate one or more tasks for execution by the GPU 102. The driver kernel outputs tasks to one or more streams being processed by the GPU 102. Each task may comprise one or more groups of related threads, referred to herein as a warp. In an embodiment, a warp comprises plural (e.g., 32) related threads that may be executed in parallel. Cooperating threads may refer to a plurality of threads including instructions to perform the task and that may exchange data through shared memory.

Figure 19:
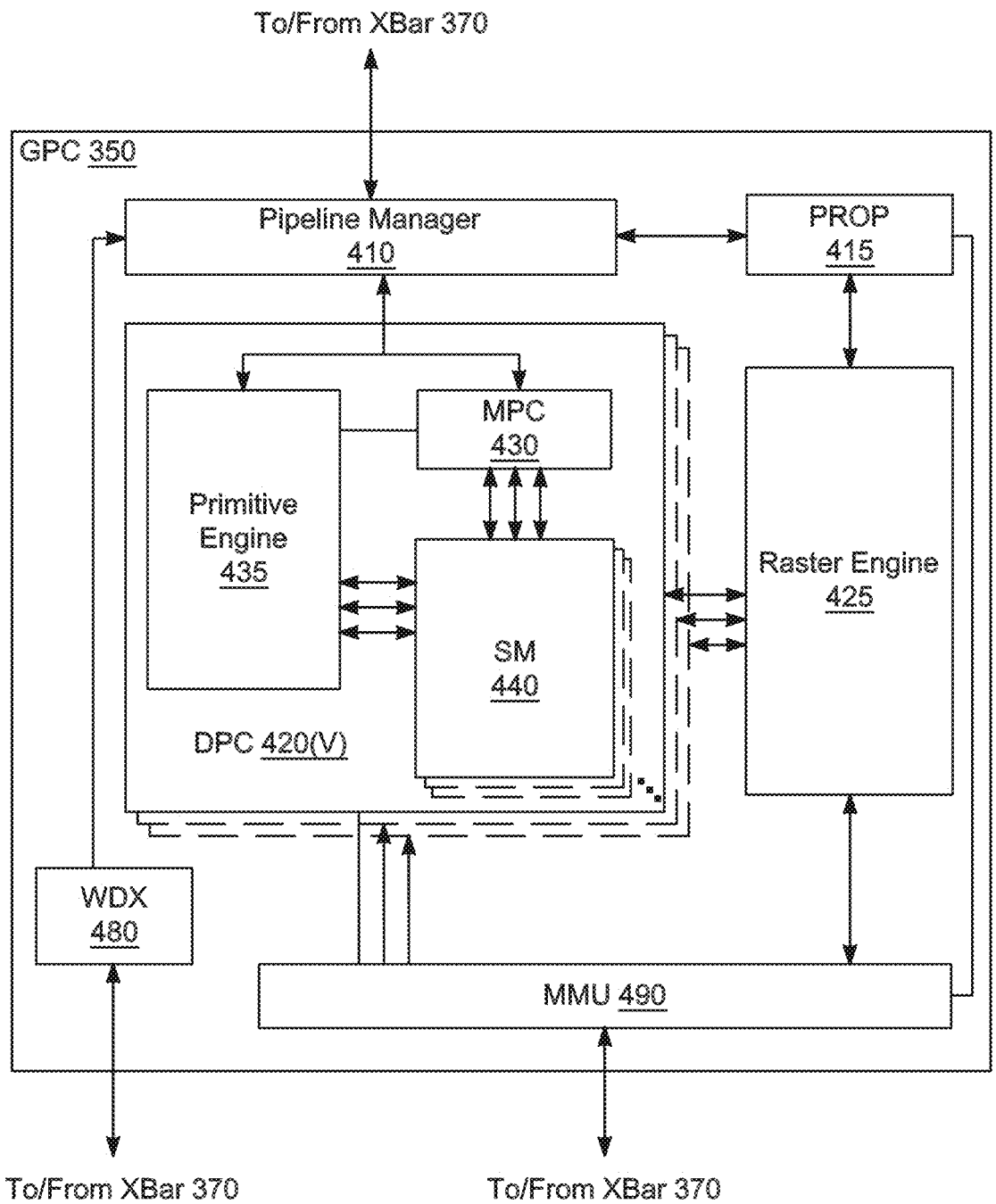
FIG. 19 illustrates an example general processing cluster within the GPU.

FIG. 19 illustrates a GPC 350 of the GPU 102 of FIG. 18, in accordance with an embodiment. As shown in FIG. 19, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 may include other hardware units in lieu of or in addition to the units shown in FIG. 20 including for example a real time ray tracing engine, a copy engine, a deep learning accelerator, an image processing accelerator, and other acceleration hardware.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline shown in FIG. 20. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 21:
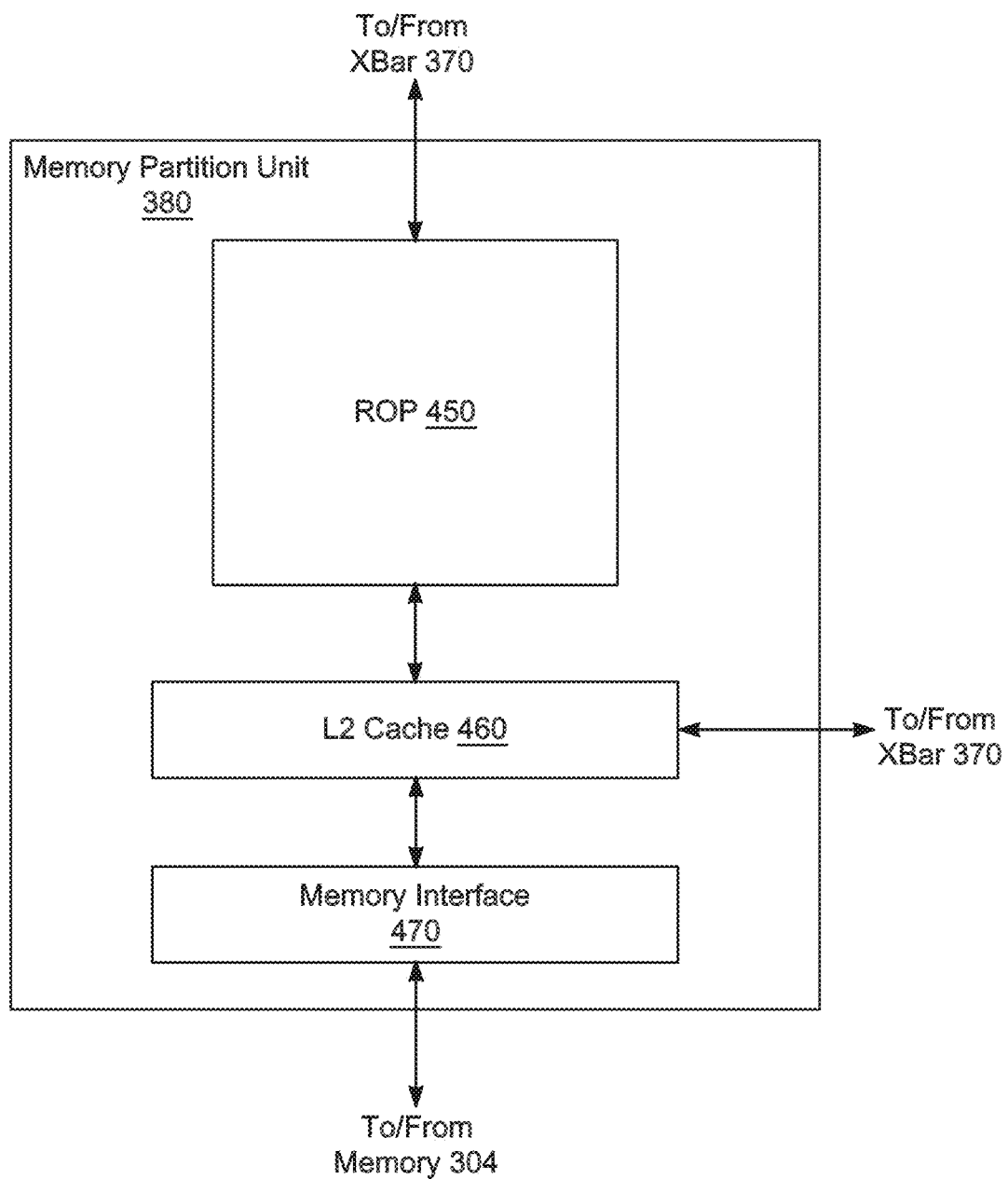
FIG. 21 illustrates an example memory partition unit of the GPU.

The PROP unit 415 is configured to route data generated by the raster engine 425 and the DPCs 420 to a Raster Operations (ROP) unit, described in more detail in conjunction with FIG. 21. The PROP unit 415 may also be configured to perform optimizations for color blending, organize pixel data, perform address translations, and the like.

Graphics Processing Pipeline

In an embodiment, the GPU 102 is configured as a graphics processing unit (GPU). The GPU 102 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The GPU 102 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the GPU 102 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 20:
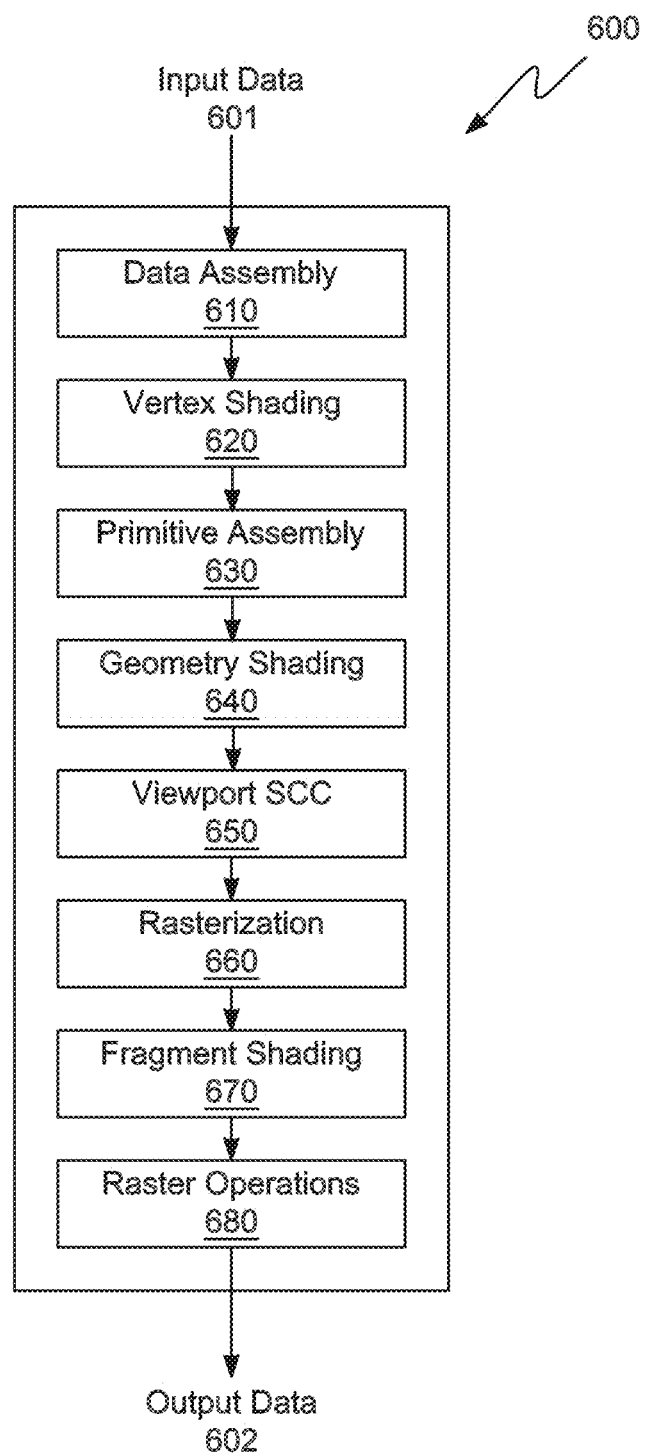
FIG. 20 is a conceptual diagram of an example graphics processing pipeline implemented by the GPU.

FIG. 20 is a conceptual diagram of a graphics processing pipeline 600 implemented by the GPU 102 of FIG. 18, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL API. As an option, the graphics processing pipeline 600 may be implemented in the context of the functionality and architecture of the previous Figures and/or any subsequent Figure(s).

As shown in FIG. 20, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. As described above, the software shading algorithms that work in connection with such shading hardware can be optimized to reduce computation time.

In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like. The raster engine 425 this includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as GPU 102. Other stages of the graphics processing pipeline 600 may be implemented by programmable hardware units such as the SM 440 of the GPU 102.

The graphics processing pipeline 600 may be implemented via an application executed by a host processor, such as a CPU 150. In an embodiment, a device driver may implement an application programming interface (API) that defines various functions that can be utilized by an application in order to generate graphical data for display. The device driver is a software program that includes a plurality of instructions that control the operation of the GPU 102. The API provides an abstraction for a programmer that lets a programmer utilize specialized graphics hardware, such as the GPU 102, to generate the graphical data without requiring the programmer to utilize the specific instruction set for the GPU 102. The application may include an API call that is routed to the device driver for the GPU 102. The device driver interprets the API call and performs various operations to respond to the API call. In some instances, the device driver may perform operations by executing instructions on the CPU. In other instances, the device driver may perform operations, at least in part, by launching operations on the GPU 102 utilizing an input/output interface between the CPU and the GPU 102. In an embodiment, the device driver is configured to implement the graphics processing pipeline 600 utilizing the hardware of the GPU 102.

Various programs may be executed within the GPU 102 in order to implement the various stages of the graphics processing pipeline 600. For example, the device driver may launch a kernel on the GPU 102 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

As shown in FIG. 19, each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state are maintained for each warp, enabling concurrency between warps and serial execution within warps when threads within the warp diverge. In another embodiment, a program counter, call stack, and execution state are maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 22.

The FIG. 19 MMU 490 provides an interface between the GPC 350 and the partition unit 380. As discussed above, the MMU 490 may provide translation of virtual addresses into physical addresses, memory protection, and arbitration of memory requests. In an embodiment as discussed above, the MMU 490 provides one or more translation lookaside buffers (TLBs) for performing translation of virtual addresses into physical addresses in the memory 304.

FIG. 21 illustrates a memory partition unit 380 of the GPU 102 of FIG. 18, in accordance with an embodiment. As shown in FIG. 21, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the GPU 102 incorporates U memory interfaces 470, one memory interface 470 per pair of partition units 380, where each pair of partition units 380 is connected to a corresponding memory device 304. For example, GPU 102 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the GPU 102, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, as discussed above, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the GPU 102 implements a multi-level memory hierarchy. In an embodiment, the memory partition unit 380 supports a unified memory to provide a single unified virtual address space for CPU and GPU 102 memory, enabling data sharing between virtual memory systems. In an embodiment the frequency of accesses by a GPU 102 to memory located on other processors is traced to ensure that memory pages are moved to the physical memory of the GPU 102 that is accessing the pages more frequently. In an embodiment, the NVLINK™ 310 supports address translation services allowing the GPU 102 to directly access a CPU's page tables and providing full access to CPU memory by the GPU 102.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache (which may be a unitary cache and shared memory) is private memory that is dedicated to a particular one or ones of SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 21, in other embodiments, the ROP unit 450 may be outside of the memory partition unit 380. For example, the ROP unit 450 may reside in the GPC 350 or another unit.

Figure 22:
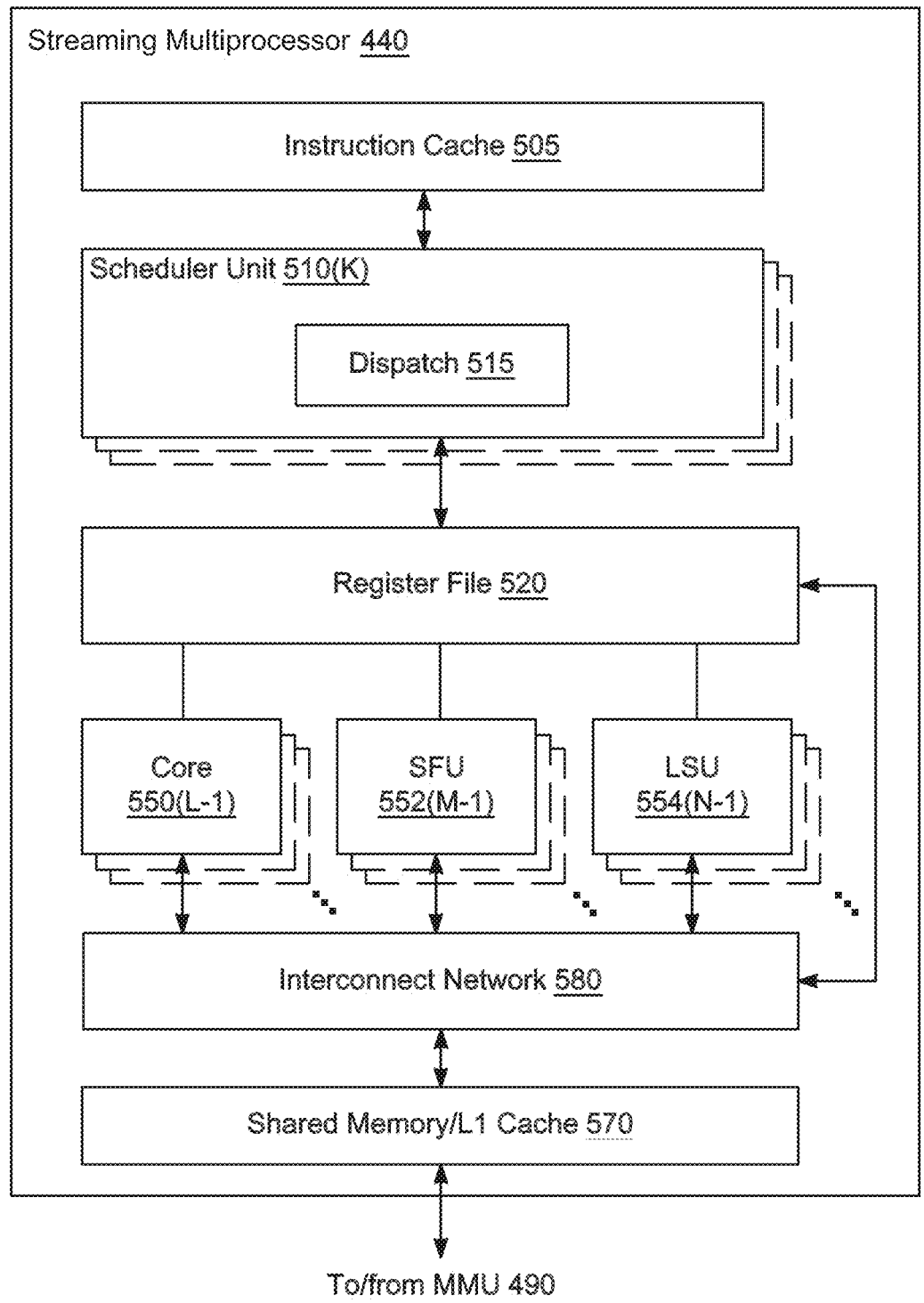
FIG. 22 illustrates an example streaming multiprocessor.

FIG. 22 illustrates the streaming multiprocessor 440 of FIG. 19, in accordance with an embodiment. As shown in FIG. 22, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the GPU 102. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A*B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

In some embodiments, transposition hardware is included in the processing cores 550 or another functional unit (e.g., SFUs 552 or LSUs 554) and is configured to generate matrix data stored by diagonals and/or generate the original matrix and/or transposed matrix from the matrix data stored by diagonals. The transposition hardware may be provided inside of the shared memory 570 to register file 520 load path of the SM 440.

In one example, the matrix data stored by diagonals may be fetched from DRAM and stored in the shared memory 570. As the instruction to perform processing using the matrix data stored by diagonals is processed, transposition hardware disposed in the path of the shared memory 570 and the register file 520 may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file 520.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs (Load-Store Units) 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file 520 and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 18, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The GPU 102 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the GPU 102 is embodied on a single semiconductor substrate. In another embodiment, the GPU 102 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the GPU 102 may be included on a graphics card that includes one or more memory devices 304. The graphics card may be configured to interface with a PCIe slot on a motherboard of a desktop computer. In yet another embodiment, the GPU 102 may be an integrated graphics processing unit (iGPU) or parallel processor included in the chipset of the motherboard.

Exemplary Computing System

Systems with multiple GPUs, fabric attached memory, and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 23:
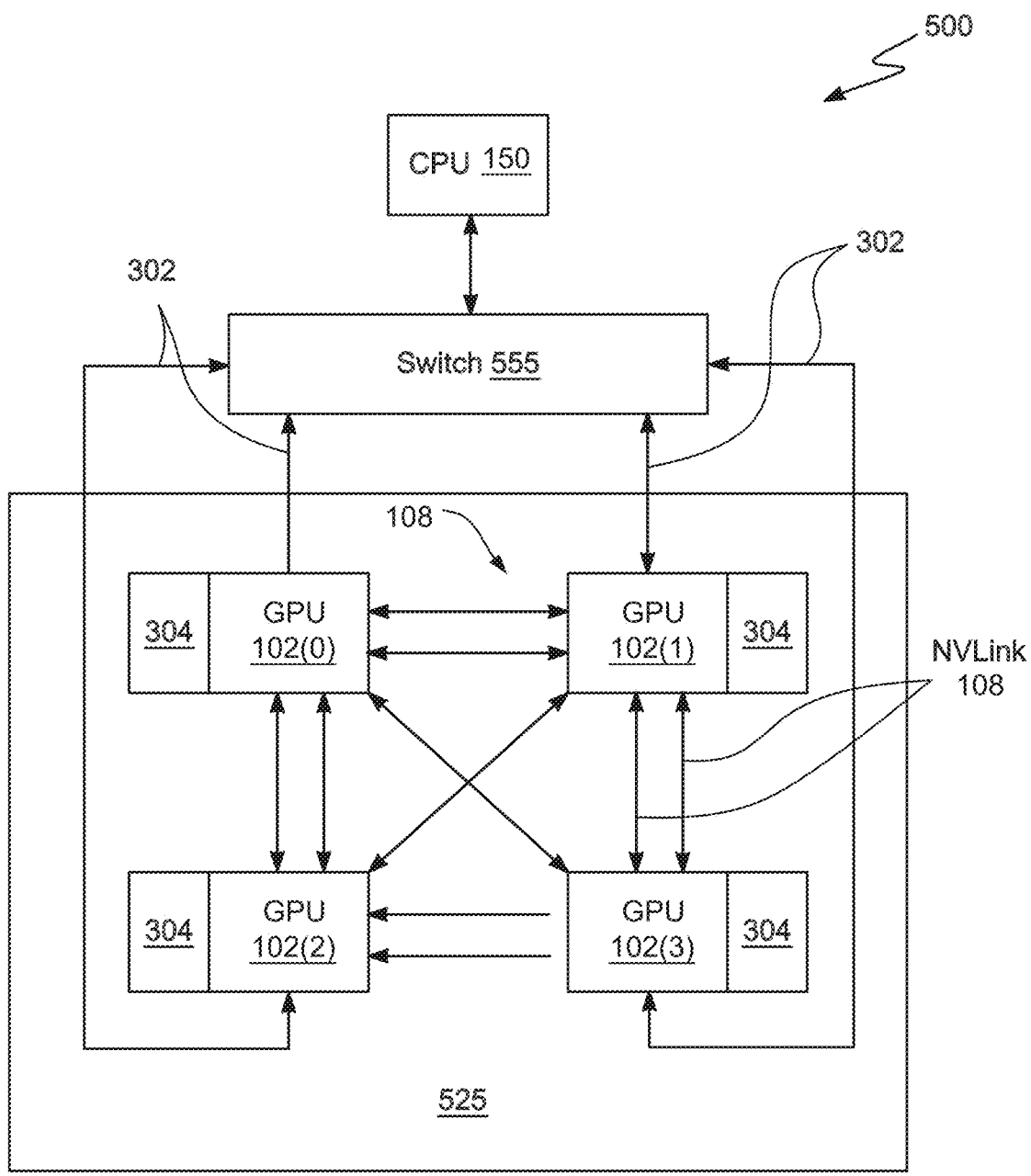
FIG. 23 is an example conceptual diagram of a processing system implemented using the GPU.

FIG. 23 is a conceptual diagram of a processing system 500 implemented using the GPU 102, in accordance with an embodiment. The exemplary system 500 may be configured to implement the methods disclosed in this application. The processing system 500 includes a CPU 530, switch 555, and multiple PPUs 300 each and respective memories 304. The NVLINK™ 108 interconnect fabric provides high-speed communication links between each of the PPUs 300. Although a particular number of NVLINK™ 108 and interconnect 302 connections are illustrated in FIG. 23, the number of connections to each GPU 102 and the CPU 150 may vary. The switch 555 interfaces between the interconnect 302 and the CPU 150. The PPUs 300, memories 304, and NVLinks 108 may be situated on a single semiconductor platform to form a parallel processing module 525. In an embodiment, the switch 555 supports two or more protocols to interface between various different connections and/or links.

In another embodiment (not shown), the NVLINK™ 108 provides one or more high-speed communication links between each of the PPUs 300 and the CPU 150 and the switch 555 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 150 and the switch 555 interfaces between each of the PPUs 300 using the NVLINK™ 108 to provide one or more high-speed communication links between the PPUs 300. In another embodiment (not shown), the NVLINK™ 310 provides one or more high-speed communication links between the PPUs 300 and the CPU 150 through the switch 555. In yet another embodiment (not shown), the interconnect 302 provides one or more communication links between each of the PPUs 300 directly. One or more of the NVLINK™ 108 high-speed communication links may be implemented as a physical NVLINK™ interconnect or either an on-chip or on-die interconnect using the same protocol as the NVLINK™ 108.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 150, switch 555, and the parallel processing module 525 are situated on a single semiconductor platform.

In an embodiment, the signaling rate of each NVLINK™ 108 is 20 to 25 Gigabits/second and each GPU 102 includes six NVLINK™ 108 interfaces (as shown in FIG. 23, five or twelve NVLINK™ 108 interfaces are included for each GPU 102). Each NVLINK™ 108 provides a data transfer rate of 25 Gigabytes/second in each direction, with six links providing 300 Gigabytes/second. The NVLinks 108 can be used exclusively for GPU-to-GPU and GPU-to-FAM communication as shown in FIG. 23, or some combination of GPU-to-GPU and GPU-to-CPU, when the CPU 150 also includes one or more NVLINK™ 108 interfaces.

In an embodiment, the NVLINK™ 108 allows direct load/store/atomic access to each PPU's 300 memory 304. In an embodiment, the NVLINK™ 108 supports coherency operations, allowing data read from the memories 304 to be stored in the cache hierarchy of the CPU 150, reducing cache access latency for the CPU 150. In an embodiment, the NVLINK™ 150 includes support for Address Translation Services (ATS), allowing the GPU 102 to directly access page tables within the CPU 150. One or more of the NVLinks 108 may also be configured to operate in a low-power mode.

Figure 24:
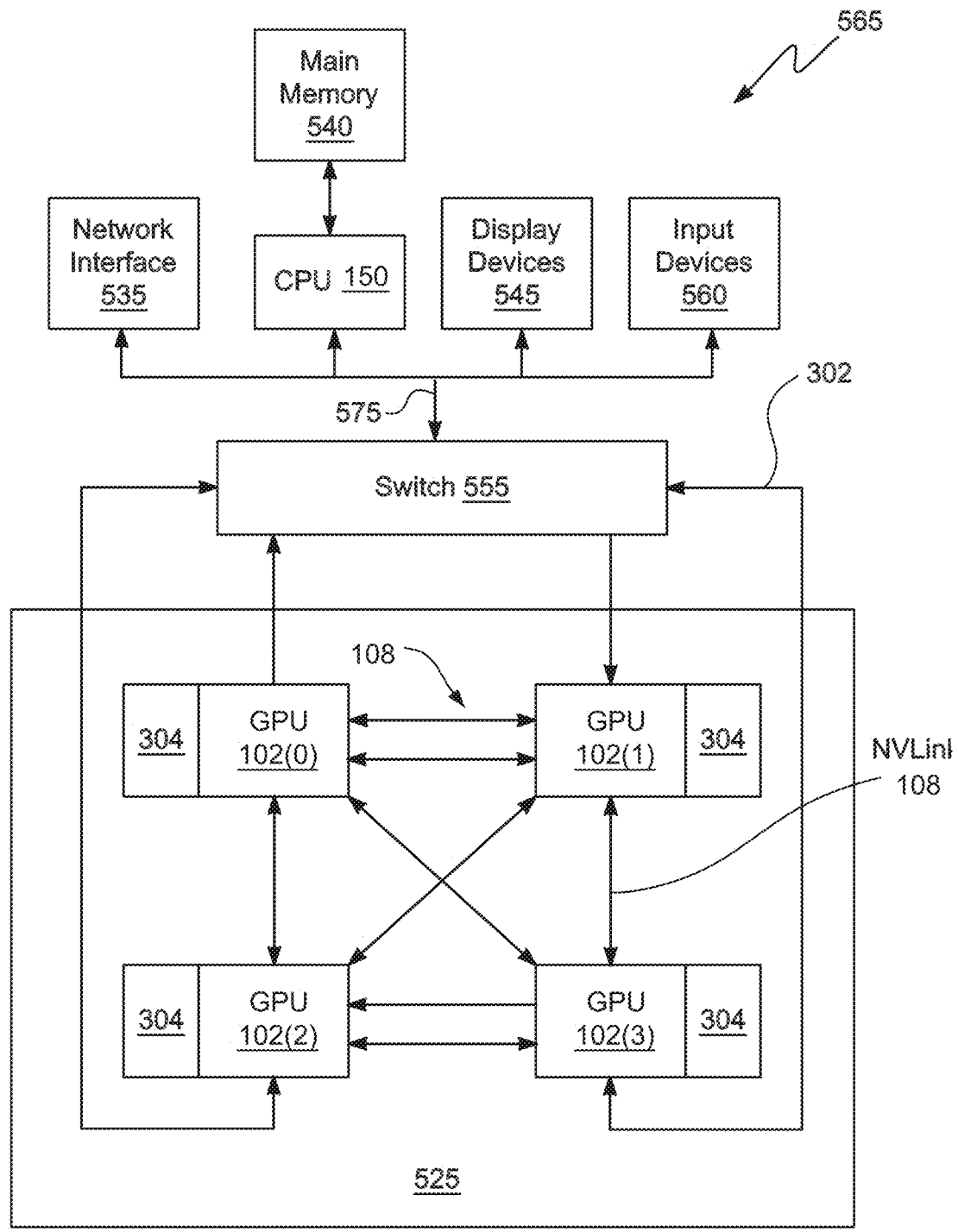
FIG. 24 is a block diagram of an exemplary processing system including additional input devices and output devices.

FIG. 24 illustrates an exemplary system 565 in which the various architecture and/or functionality of the various previous embodiments may be implemented. The exemplary system 565 may be configured to implement the technology disclosed in this application.

As shown, a system 565 is provided including at least one central processing unit 150 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

In summary, Fabric Attached Memory (FAM) enables much higher capacity at high bandwidth and low latency. FAM permits memory capacity and bandwidth to grow independently of GPUs and CPUs. FAM also enables systems to achieve memory "disaggregation"-pool with multiple TBs and multiple TB/s bandwidth. Such capabilities are expected to be especially helpful for competing in datacenter applications while leveraging existing hardware and software technologies as building blocks (e.g., NVLink/NVSwitch, CUDA, UVM, etc.) Example use cases include:

Big Data (e.g., In-memory Databases, Graph Analytics, ETL (extraction, transform, load)-Analytics)
HPC (Data Visualization, Quantum Chemistry, Astrophysics (Square Kilometer Array of Radio telescopes)
AI (Recommender Engines, Deep Learning datasets, parameter & temporal data storage, Network activation offload, Computational pathology, medical imaging
Graphics Rendering
Wherever there are large quantities of data that need to be accessed at high bandwidth.

Example Feature Combinations

Some example non-limiting embodiments thus provide a fabric attached memory comprising a graphics processor configured to communicate with an interconnect fabric; and at least one memory operatively coupled to the graphics processor, the graphics processor being structured to perform at least one read-modify-write atomic memory access command on the at least one memory, wherein the graphics processor is further configured such that a compute circuit capability is defective, disabled or not present.

The graphic processor compute circuit is fused. The graphics processor comprises at least one streaming multiprocessor. The interconnect fabric may comprise NVIDIA NVLINK™.

The graphics processor may include a plurality of fabric interconnect ports only a subset of which are configured to connected to the interconnect fabric. The memory may comprise at least one dual inline memory module comprising semiconductor random access memory.

A fabric attached memory system may comprise an interconnect fabric; at least one source GPU interconnected to the interconnect fabric, the source GPU generating a memory address; and plural fabric attached memories interconnected to the interconnect fabric, the plural fabric attached memories each defining an address space; wherein the interconnection between the source GPU and the interconnect fabric and the interconnection between each of the fabric attached memory devices and the interconnect fabric are asymmetrical; and wherein at least one of the source GPU, the interconnect fabric and the plural fabric attached memories includes an address transformer that transforms the memory address the at least one source GPU generates into a fabric attached memory address space.

The address transformer may comprise a division or compaction circuit. The address transformer may include a swizzler and an address compactor. The at least one GPU may swizzle the generated address in order to select an interconnect link within the interconnect fabric. Each fabric attached memory device address space may be less than an address space defined by the memory address the GPU generates.

An interconnect fabric switch may comprise input ports; output ports; and routing tables that enable the switch to route to the output ports, fabric attached memory access requests received on input ports, wherein the routing tables control the switch to selectively compact addresses within said memory access requests to compensate for fabric attached memory capacity.

The routing tables may further control the switch to selectively transform addresses to compensate for entropy-based distribution of said memory access requests on the input ports. The routing tables may further control the switch to shuffle addresses to prevent collisions of memory access requests on different input ports converging on the same fabric attached memory (in some embodiments, the NVLINK™ fabric is not fully convergent at FAM so that a given FAMM device needs to see only subset of planes). The routing tables may further select base and/or limit address checking for addresses that map into irregularly-sized regions of fabric attached memory. The routing tables may further enable address offset addition to select a different partition in the fabric attached memory device's address space.

A method of accessing a fabric attached memory may comprise generating a memory access request; using entropy to select a link over which to send the memory access request; transforming an address within the memory access request to compensate for said entropy selection; further transforming the address to compensate for disparity between the size of the address the transformed address defines and the size of the address of a fabric attached memory; and applying the further-transformed address to access the fabric attached memory.

A fabric attached memory baseboard comprises a printed circuit board; a plurality of fabric attached memory modules disposed on the printed circuit board, each of the plurality of fabric attached memory modules connected to an interconnect fabric, and a processor disposed on the printed circuit board, the processor managing the plurality of fabric attached memory modules; wherein the plurality of fabric attached memory modules each are capable of performing GPU atomic memory operations and peer-to-peer GPU communications via the interconnect fabric while disaggregating the quantity of compute-capable GPUs from the memory capacity provided by the fabric attached memory modules.

The plurality of fabric attached memory modules may each include a floor swept GPU that is at least in part defective and/or fused to disable GPU compute operations. The plurality of fabric attached memory modules may each comprise a memory controller that has no GPU compute capability but comprises: a boot ROM; a DDR memory controller capable of hardware-accelerating said atomics without emulation; a DRAM row remapper; a data cache; a crossbar interconnection; and a fabric interconnect interface capable of peer-to-peer communication over the interconnect fabric with GPUs.

All patents and printed publications referred to above are incorporated by reference herein as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An interconnect fabric switch comprising:
input ports;
output ports; and
routing tables that enable the switch to route to the output ports, fabric attached memory access requests received on input ports,
wherein the routing tables control the switch to selectively compact addresses within said memory access requests to compensate for a difference in size between (a) an address space of a source graphics processing unit providing the fabric attached memory access requests to an input port, and (b) an address space of a fabric attached memory connected to an output port by transforming an address the source graphics processing unit provides into a range of address values the fabric attached memory accommodates, the transforming compacting holes in the memory space created by an address space interleave.

2. An interconnect fabric switch comprising:
input ports;
output ports; and
routing tables that enable the switch to route to the output ports, fabric attached memory access requests received on input ports,
wherein the routing tables control the switch to selectively compact addresses within said memory access requests to compensate for a difference in size between (a) an address space of a source graphics processing unit providing the fabric attached memory access requests to an input port, and (b) an address space of a fabric attached memory connected to an output port, wherein the routing tables further control the switch to selectively transform addresses to compensate for entropy-based distribution of said memory access requests on the input ports.

3. An interconnect fabric switch comprising:
input ports;
output ports; and
routing tables that enable the switch to route to the output ports, fabric attached memory access requests received on input ports,
wherein the routing tables control the switch to selectively compact addresses within said memory access requests to compensate for a difference in size between (a) an address space of a source graphics processing unit providing the fabric attached memory access requests to an input port, and (b) an address space of a fabric attached memory connected to an output port, wherein the routing tables further control the switch to shuffle addresses to prevent collisions of memory access requests on different input ports converging on the same fabric attached memory.

4. An interconnect fabric switch comprising:
input ports;
output ports; and
routing tables that enable the switch to route to the output ports, fabric attached memory access requests received on input ports,
wherein the routing tables control the switch to selectively compact addresses within said memory access requests to compensate for a difference in size between (a) an address space of a source graphics processing unit providing the fabric attached memory access requests to an input port, and (b) an address space of a fabric attached memory connected to an output port, wherein the routing tables further select base and/or limit address checking for addresses that map into irregularly-sized regions of fabric attached memory.

5. An interconnect fabric switch comprising:
input ports;
output ports; and
routing tables that enable the switch to route to the output ports, fabric attached memory access requests received on input ports,
wherein the routing tables control the switch to selectively compact addresses within said memory access requests to compensate for a difference in size between (a) an address space of a source graphics processing unit providing the fabric attached memory access requests to an input port, and (b) an address space of a fabric attached memory connected to an output port, wherein the routing tables further enable address offset addition to select a different partition in the fabric attached memory and/or to avoid address collisions on fabric attached memory devices that converge planes.

6. An interconnect fabric switch comprising:
input ports;
output ports; and
routing tables that enable the switch to route to the output ports, fabric attached memory access requests received on input ports,
wherein the routing tables control the switch to selectively compact addresses within said memory access requests to compensate for a difference in size between (a) an address space of a source graphics processing unit providing the fabric attached memory access requests to an input port, and (b) an address space of a fabric attached memory connected to an output port, wherein the switch performs automatic target identification generation/incrementing on compacted addresses.

7. A method of accessing a fabric attached memory comprising:
generating a memory access request;
using entropy to select a link over which to send the memory access request;
transforming an address within the memory access request to compensate for said entropy selection;
further transforming the address to compensate for disparity between the size of the address the transformed address defines and the size of the address of a fabric attached memory; and
applying the further-transformed address to access the fabric attached memory.

8. A method of accessing a fabric attached memory comprising:
generating a memory access request;
using entropy to select a link over which to send the memory access request; and
using a routing table in a fabric switch to transform an address within the memory access request to provide selectable stripe step sizes across a fabric attached memory.

9. A method of providing fabric attached memory comprising:
attaching at least one collection of memory devices to an interconnect fabric as a stripe to provide more total capacity or memory bandwidth to at least one source GPU running an application; and
executing memory allocation software to configure the number of fabric attached memory devices comprising the stripe and the number of links over which accesses are made to the stripe depending on the capacity and bandwidth needs of the application.

10. The method of claim 9 further including dedicating the stripe to a single source GPU and/or a single virtual machine by constructing the stripe through design of a switching fabric and/or through programming of switch routing tables.

11. The method of claim 10 further including preventing accesses from GPUs other than the single source GPU and/or from virtual machines other than the single virtual machine are prevented through security checks in the switching fabric.

12. The method of claim 9 further including sharing the stripe between multiple source GPUs running under the same virtual machine and/or by multiple source GPUs running under different virtual machines, depending on a data sharing model for the application.

13. The method of claim 9 further including controlling congestion to ensure that bandwidth to a set of fabric attached memory stripes is shared equally among plural source GPUs.

14. The method of claim 13 wherein controlling congestion comprises employing injection-rate limiting in the at least one source GPU and/or fabric switches.

15. A method of providing fabric attached memory comprising:
    attaching at least one memory device and associated donor computing component to an interconnect fabric to provide more total capacity or memory bandwidth to at least one source GPU running an application; and
    enabling the donor computing component, depending on its floor swept capabilities, to offload certain housekeeping and/or management tasks from a centralized system management processor and/or host CPU, including performing a memory diagnostic at system initialization time and/or a security measure.

16. The method of claim 15 wherein the security measure comprises clearing the content of the at least one memory device upon shifting ownership of the at least one memory device from one virtual machine to another.

* * * * *